US008565201B2

(12) United States Patent
Jeong et al.

(10) Patent No.: US 8,565,201 B2
(45) Date of Patent: Oct. 22, 2013

(54) METHOD AND APPARATUS FOR HYBRID VIRTUAL MIMO TRANSMISSION IN WIRELESS AD-HOC NETWORK

(75) Inventors: Wun-Cheol Jeong, Daejeon-si (KR);
Jong-Moon Chung, Seoul (KR);
Joon-Hyung Kim, Seoul (KR);
Dong-Hyuk Han, Seoul (KR);
Seong-Soon Joo, Daejeon-si (KR);
Jong-Suk Chae, Daejeon-si (KR)

(73) Assignees: Electronics and Telecommunications Research Institute Industry-Academic Cooperation Foundation, Daejeon (KR); Yonsei University, Seoul (KR)

( * ) Notice: Subject to any disclaimer, the term of this patent is extended or adjusted under 35 U.S.C. 154(b) by 404 days.

(21) Appl. No.: 12/949,377

(22) Filed: Nov. 18, 2010

(65) Prior Publication Data

US 2011/0142159 A1 Jun. 16, 2011

(30) Foreign Application Priority Data

Dec. 15, 2009 (KR) .................. 10-2009-0125133
May 14, 2010 (KR) .................. 10-2010-0045499

(51) Int. Cl.
*H04Q 7/24* (2006.01)

(52) U.S. Cl.
USPC ........... 370/338; 370/312; 370/328; 370/351; 370/395.21

(58) Field of Classification Search
USPC ........ 370/312, 328, 338, 351, 395.21; 455/25
See application file for complete search history.

(56) References Cited

U.S. PATENT DOCUMENTS

2004/0192204 A1* 9/2004 Periyalwar et al. ............. 455/25
2010/0061324 A1* 3/2010 Liao et al. ..................... 370/329

FOREIGN PATENT DOCUMENTS

KR  10-2005-0040915  5/2005
WO  WO 2004/014091  2/2004

OTHER PUBLICATIONS

Wendi B. Heinzelman et al., "An Application-Specific Protocol Architecture for Wireless Microsensor Networks", IEEE Transactions on Wireless Communications, vol. 1—No. 4, Oct. 2002, pp. 660-670.
Shuguang Cui et al., "Energy-Efficiency of MIMO and Cooperative MIMO Techniques in Sensor Networks", IEEE Journal on Selected Areas in Communications, vol. 22—No. 6, Aug. 2004, pp. 1089-1098.

(Continued)

*Primary Examiner* — Yemane Mesfin
*Assistant Examiner* — Wanda Z Russell
(74) *Attorney, Agent, or Firm* — Staas & Halsey LLP

(57) ABSTRACT

A hybrid virtual multiple-input multiple-output (V-MIMO) transmission method of a management node in a wireless ad-hoc network in which a transmission path from a source node to a destination node is divided into one or more sections is provided. The hybrid V-MIMO transmission method includes obtaining one or more pieces of node information of one or more nodes by transmitting an information request message to the nodes in response to a transmission request message for data transmission from the source node to the destination node; setting a shortest path (SP) from the source node to the destination node based on the obtained node information; determining transmission schemes individually for nodes present on the SP; issuing a transmission preparation request by transmitting the determined transmission schemes to the respective corresponding nodes; and transmitting a transmission start message to the source node in response to transmission ready responses from the respective nodes.

17 Claims, 22 Drawing Sheets

(56) References Cited

OTHER PUBLICATIONS

Sudharman K. Jayaweera, "Virtual MIMO-based Cooperative Communication for Energy-constrained Wireless Sensor Networks", IEEE Transactions on Wireless Communications, vol. 5—No. 5, May 2006, pp. 984-989.

Yong Yuan et al., "Virtual MIMO-Based Cross-Layer Design for Wireless Sensor Networks", IEEE Transactions on Vehicular Technology, vol. 55—No. 3, May 2006, pp. 856-864.

* cited by examiner

METHOD AND APPARATUS FOR HYBRID VIRTUAL MIMO TRANSMISSION IN WIRELESS AD-HOC NETWORK

CROSS-REFERENCE TO RELATED APPLICATION(S)

This application claims the benefit under 35 U.S.C. §119 (a) of a Korean Patent Application Nos. 10-2009-0125133, filed on Dec. 15, 2009, and 10-2010-0045499, filed on May 14, 2010, in the Korean Intellectual Property Office, the entire disclosures of which are incorporated herein by references for all purposes.

BACKGROUND

1. Field

The following description relates to a method and apparatus for multiple input multiple output (MIMO) routing, and more particularly, to a method and apparatus for hybrid virtual MIMO transmission in a wireless ad-hoc network.

2. Description of the Related Art

Various multiple-input multiple-output (MIMO) transmission techniques have been developed utilizing the nature of high bandwidth efficiency of the MIMO transmission scheme. However, for MIMO routing, a transmitter and a receiver are configured to have a complex circuit structure, which consumes a great amount of energy, and the MIMO routing is difficult to employ in a wireless ad-hoc network.

Moreover, numerous antennas must be installed in a small sensor for MIMO routing, and such installation hinders the implementation of the MIMO routing. To overcome the above drawback, a virtual MIMO (V-MIMO) transmission technique using a virtual antenna array has been proposed so that the MIMO technique can be applied to an ad-hoc network.

An ad-hoc network employing V-MIMO has an advantage of multiplexing gain that is retained by MIMO transmission, but has a disadvantage in that extra energy is required for cooperation between sensors participating in routing and transmission delay. Thus, in the case of short data transmission distance, the V-MIMO is not efficient in terms of energy and delay time.

SUMMARY

The following description relates to a multiple-input multiple-output (MIMO) transmission apparatus and method which can maximize energy efficiency under a wireless ad-hoc network multiple-hop transmission environment which has limited energy.

In addition, provided are a MIMO transmission apparatus and method which satisfy quality of service (QoS) while taking energy efficiency into consideration to reduce a transmission delay time between a source node and a destination node.

Furthermore, provided are a MIMO transmission apparatus and method which establish a routing path optimal to network configuration and QoS requirements of traffic by variably adjusting a distance of a data transmission section.

In one general aspect, provided is a hybrid virtual multi-input multi-output (V-MIMO) transmission method of a management node in a wireless ad-hoc network in which a transmission path from a source node to a destination node is divided into one or more sections, the hybrid V-MIMO transmission method including: obtaining one or more pieces of node information of one or more nodes by transmitting an information request message to the nodes in response to a transmission request message for data transmission from the source node to the destination node; setting a shortest path (SP) from the source node to the destination node based on the obtained node information; determining transmission schemes individually for nodes present on the SP; issuing a transmission preparation request by transmitting the determined transmission schemes to the respective corresponding nodes; and transmitting a transmission start message to the source node in response to transmission ready responses from the respective nodes.

In another general aspect, provided is a hybrid virtual multiple-input multiple-output (V-MIMO) transmission method in a wireless ad-hoc network in which a transmission path from a source node to a destination node is divided into one or more sections, the hybrid V-MIMO transmission method including: setting a shortest path (SP) from the source node to the destination node between the source node and the destination node; obtaining pieces of node information of neighboring nodes present within a set domain of each of the source node, the destination node, and SP nodes and determining transmission schemes for the respective nodes based on the obtained information; requesting transmission preparation by transmitting the determined transmission schemes to corresponding nodes from the respective source node, destination node, and SP nodes; and starting transmission at the source node in response to transmission ready responses from the respective nodes.

Other features and aspects will be apparent from the following detailed description, the drawings, and the claims.

Figure 1:
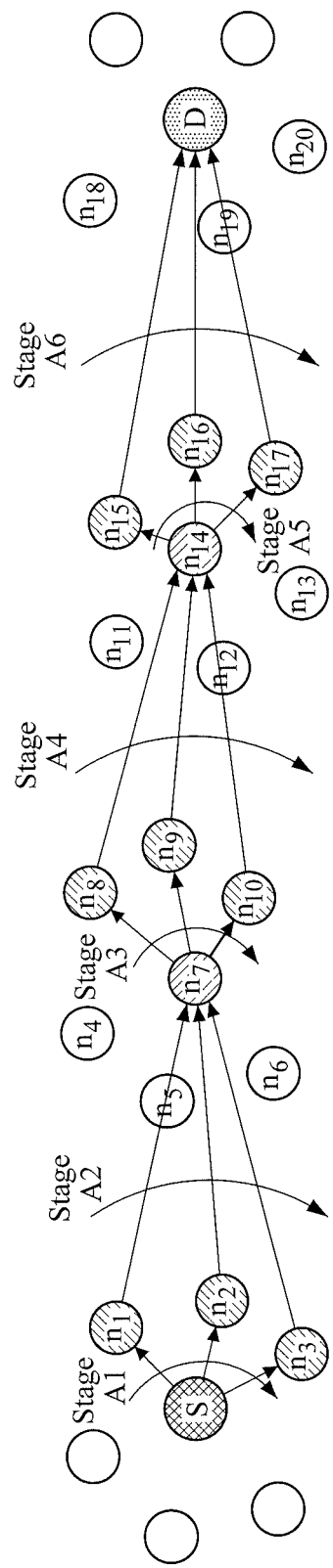
FIGS. 1 to 3 illustrate examples showing how a transmission scheme operates in a wireless ad-hoc network where a transmission section is divided into three sections.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

In an example described below, a wireless ad-hoc network includes sensor nodes, each of which has an omnidirectional antenna. The sensor nodes may be classified into relay nodes (RNs), combining nodes (CNs), and management nodes (MNs) based on the functionality.

MNs collect characteristics and location information of all nodes in the network to configure a routing path.

CNs perform combined space diversity decoding simultaneously on a plurality of received signals. In addition, the CNs may be classified into section CNs (SCNs) and relay CNs (RCNs) based on the functionality. The SCNs decode data received within one section, then encode the decoded data and transmit the encoded data to the next section. The RCNs simply forward information that has been encoded for virtual multiple-input multiple-output (V-MIMO) transmission to the SCNs.

In a method to be described below, a routing path between a source node S and a destination node D is divided into one or more sections and data is routed in such a scheme that is optimal to characteristics of each section.

A method of configuring a routing path between the source node S and the destination node D according to a transmission scheme will now be described.

Figure 2:
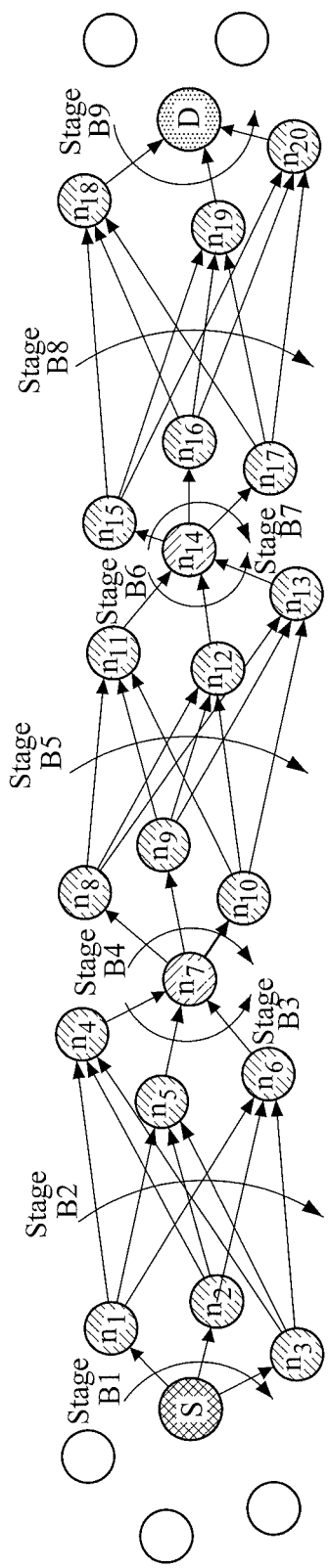
Figure 3:
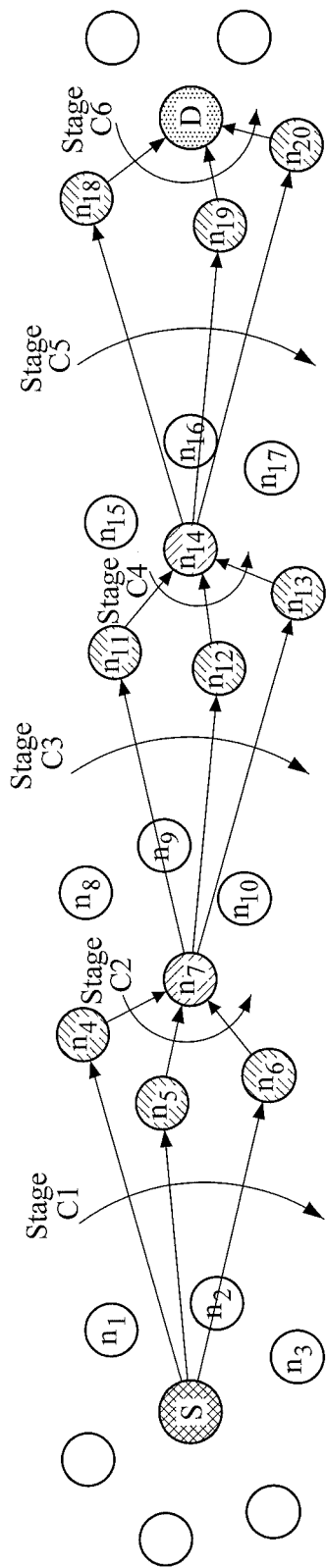

FIGS. 1 to 3 illustrate examples showing how a transmission scheme operates in a wireless ad-hoc network where a transmission section is divided into three sections.

FIG. 1 illustrates an example showing how a virtual multiple-input single-output (V-MISO) transmission scheme operates. In FIG. 1, D, n7, and n14 denote SCNs, and n1, n2, n3, n8, n9, n10, n15, n16, and n17 denote RNs.

At stage A1, a source node S as an SCN assigns data to the respective RNs n1, n2, and n3, and the respective RNs n1, n2, and n3 forward the received data to the next SCN n7 in the next section at stage A2. The SCN n7 that has received the forwarded data encodes the received data and assigns the encoded data to the respective RNs n8, n9, and n10 in the next section. Stage A3 and stage A5 are the same as stage A1, and stage A4 and stage A6 are the same as stage A2. Data routing is performed in three sections including stages A1 and A2, stages A3 and A4, and stages A5 and A6.

FIG. 2 illustrates an example showing how a V-MIMO transmission scheme operates. In FIG. 2, n7, n14, and D denote SCNs, n1, n2, n3, n8, n9 n10, n15, n16, and n17 denote RNs, and n4, n5, n6, n11, n12, n13, n18, n19, and n20 denote RCNs.

At stage B1, a source node S as an SCN assigns data to RNs n1, n2, and n3 in the next section. At stage B2, the respective RNs n1, n2, and n3 route the data concurrently to the RCNs n4, n5, and n6 in the next section. At stage B3, the respective RCNs n4, n5, and n6 encode the received data and forward the encoded data to the SCN n7 in the next section. Stage B4 and stage B7 are the same as stage B1, and stage B5 and stage B8 are the same as stage B2. Stage B6 and stage B9 are the same as stage B3. Data routing is performed in three sections including stages B1 to B3, stages B4 to B6, and stages B7 to B9.

FIG. 3 illustrates an example showing how a virtual single-input multiple-output (V-SIMO) transmission scheme operates. In FIG. 3, n7, n14, and D denote SCNs and n4, n5, n6, n11, n12, n13, n18, n19, and n20 denote RNs.

At stage C1, the SCN transmits data to the respective RNs n4, n5, and n6 in the next section. At stage C2, the respective RNs n4, n5, and n6 transmit the received data concurrently to the SCN n7 in the next section, and the SCN that has received data simultaneously from the RNs n4, n5, and n6 encodes the data and forwards the encoded data to the RNs n11, n12, and n13 in the next section. Stage C3 and stage C5 are the same as stage C1, and stage C4 and stage C6 are the same as stage C2. Data routing is performed in three sections including stages C1 and C2, stages C3 and C4, and stages C5 and C6.

Figure 4:
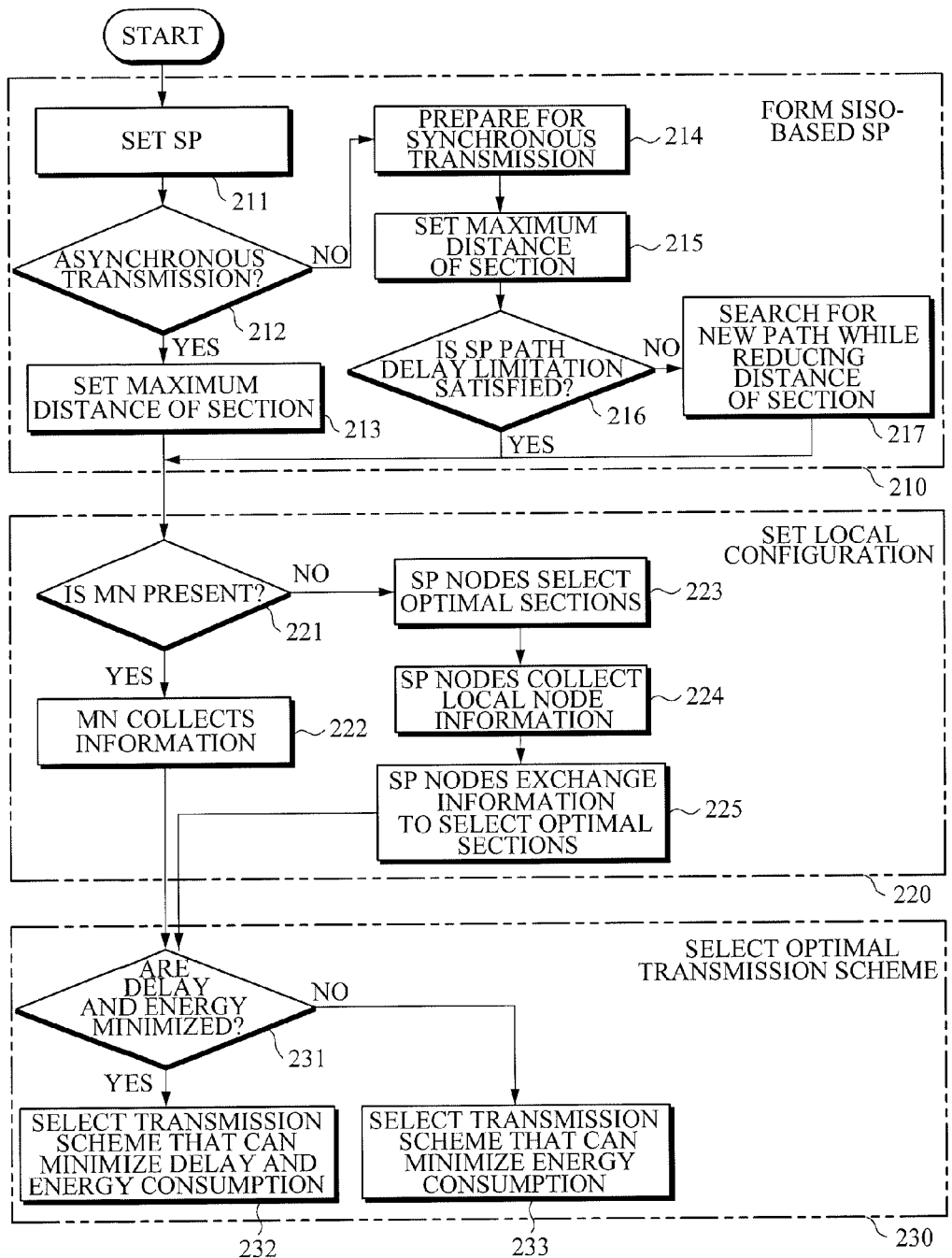
FIGS. 4 to 6 are flowcharts of examples of a method of hybrid V-MIMO transmission in a wireless ad-hoc network.

FIG. 4 illustrates a flowchart of an example of a method of hybrid V-MIMO transmission in a wireless ad-hoc network.

Referring to FIG. 4, the method primarily includes three stages: single-input single-output (SISO)-based shortest path (SP) generation 210 between a source node and a destination node, local configuration set-up 220 in which nodes on the path collect information of adjacent nodes and exchange information, and optimal transmission scheme selection 230 based on the exchanged information.

The SISO-based SP generation 210 may be implemented in various ways according to a routing scheme or a transmission scheme.

A routing scheme may include centralized routing and distributed routing. In the centralized routing, an MN sets the SP from the source node to the destination node by the use of routing protocol, such as location aided routing (LAR) and greedy perimeter stateless routing (GPSR), which utilizes geographical information.

If a global positioning system (GPS) is available, latitude and longitude information provided from the GPS may be used as information of distance and location, and otherwise, a distance is estimated from received signal strength indicator.

In the distributed routing, the SP from the source node to the destination node is set by the use of flat routing protocol such as ad-hoc on-demand distance vector (AODV) and dynamic source routing (DSR).

There are two types of transmission schemes. One is asynchronous and the other synchronous. In asynchronous transmission, a path is set in such a manner as to minimize the number of sections between the source node and the destination node. That is, a distance of each section is as extended as much as possible so that data can reach the destination via the minimum number of nodes. This is because the fewer intermediate nodes are present, the less energy is required.

In synchronous transmission, a path that has the smallest number of intermediate nodes while satisfying a limitation of periodic packet transfer delay time is selected. In consideration of multiple access, given the distance of a section as X, if one node transmits data, adjacent nodes within an area of $\pi(2x)^2$ m$^2$ around the node cannot transmit data concurrently. Thus, as the distance of the section increases, the standby time of each node for transmission increases, resulting in transfer delay. Hence, the distance of the section should be set such that the periodic transfer delay does not exceed the limitation of traffic delay time.

In the local configuration set-up (220), for the centralized routing, an MN collects information of nodes around the path and exchanges the information with the nodes, and for the distributed routing, SISO-based SP nodes do the same as the MN. Information to be collected includes a distance of each section, location information of each node, and spatial multiplexing encoding and decoding capabilities of the node. The ad-hoc network may check information of a CN and RN of a transmitter and a receiver of each section, thereby determining whether V-SIMO, V-MISO, or V-MIMO transmission is possible.

In the transmission scheme selection (230), only transmission distance-energy efficiency ratings are referred to. A ranking of the energy efficiency of SISO, V-SIMO, V-MISO, and V-MIMO varies according to data transfer distance.

In the case of a short section, among SISO, V-MISO, V-SIMO, and V-MIMO, each has higher energy efficiency than the subsequent one. However, as a section is lengthened, a ranking of the energy efficiency of the transmission schemes is changed. Points of a section, around each of which the ranking of the energy efficiency of the transmission schemes is changed, are respectively represented by $d_{T1}$, $d_{T2}$, and $d_{T3}$.

$d_{T1}$ is a distance point at which the ranking of the energy efficiency of the transmission schemes is changed to the order of V-MISO, V-SIMO, SISO, and V-MIMO. $d_{T2}$ is a distance point at which the ranking of the energy efficiency of the transmission schemes is changed to the order of V-MISO, V-SIMO, V-MIMO, and SISO. $d_{T3}$ is a distance point at which the ranking of the energy efficiency of the transmission schemes is changed to the order of V-MIMO, V-MISO, V-SIMO, and SISO.

Accordingly, through the hybrid V-MIMO transmission which selects the transmission scheme that yields the optimal energy efficiency in accordance with a section distance, high energy efficiency can be ensured.

A procedure of the SISO-based SP generation (210) will be described in detail.

At 211, the SISO-based SP from the source node to the destination node is set. Although not illustrated, as described above, the centralized hybrid routing uses a routing scheme such as LAR or GPSR that utilizes geographical information, and the distributed hybrid routing uses a flat routing scheme such as AODV or DSR.

As described above, at 212, it is determined whether a transmission scheme is an asynchronous packet transmission, and as the result of the determination, the procedure proceeds to operation 213 or 214.

If it is determined that the transmission scheme is an asynchronous packet transmission at 212, a distance of a section is maximized in consideration of signal amplification capability of a node so as to minimize the number of sections at 213.

If it is determined that the transmission scheme is a synchronous packet transmission at 212, priority signal information is divided into frames and time slots and synchronized with one another at 214, and a distance of a section is maximized at 215 in the similar manner as the asynchronous transmission. Then, at 216, it is checked whether the SP satisfies a packet transfer delay limitation. If it is determined that the SP does not satisfy the packet transfer delay limitation at 216, a new path is set to find a point that satisfies the packet transfer delay limitation by reducing the distance of a section at 217.

A procedure of the local configuration set-up 220 will be described in detail below.

According to the presence of an MN at 221, the procedure proceeds to operation 222 or 223.

For the case of the centralized hybrid routing in which the MN is present, at 222, the MN collects location information, node availability, and spatial multiple encoding and decoding capabilities of each node, integrally manages the collected information, and determines whether V-SIMO, V-MISO, and V-MIMO transmissions are possible in each section based on the collected information at 222.

For the case of the distributed hybrid routing, nodes present on the SP (hereinafter referred to as "SP nodes (SPNs)") perform optimal section selection at 223. Although not illustrated, all CNs in the network collect node information of all nodes that are present within one-hop from each CN. The node information to be collected may include, as described above, location information, node availability, and spatial multiple encoding and decoding capabilities. Once the CN completely collects the node information of all nodes in a corresponding section, the CN forwards the collected node information to the SPN. Then the SPN collects the node information forwarded from local nodes such as CNs at 224. At 225, the SPN exchanges the received node information with another SPN and determines whether V-SIMO, V-MISO, and V-MIMO transmissions are possible in each section. A range of node information to be exchanged between SPNs may be varied by a setting value, which is generally 2 hops.

Node availability of the node information to be collected is a value that is decided in consideration of an amount of remaining energy of the node and an amount of traffic currently supported, the corresponding node determines the node availability by itself, and the node availability has a higher priority as more energy remains and less traffic is currently supported.

The procedure of the optimal transmission scheme selection 230 will be described in detail below.

At 230, the optimal transmission scheme may be selected in two ways according to requirements for service quality of traffic.

Specifically, at 231, it is determined whether the service quality of traffic requires minimization of energy consumption and delay time. When it is determined at 231 that the minimization of energy consumption and delay time is required, the delay time and energy consumption are minimized at 232. Alternatively, if the service requirements do not specify delay time limitation, only an energy minimization algorithm is performed at 233.

Figure 5:
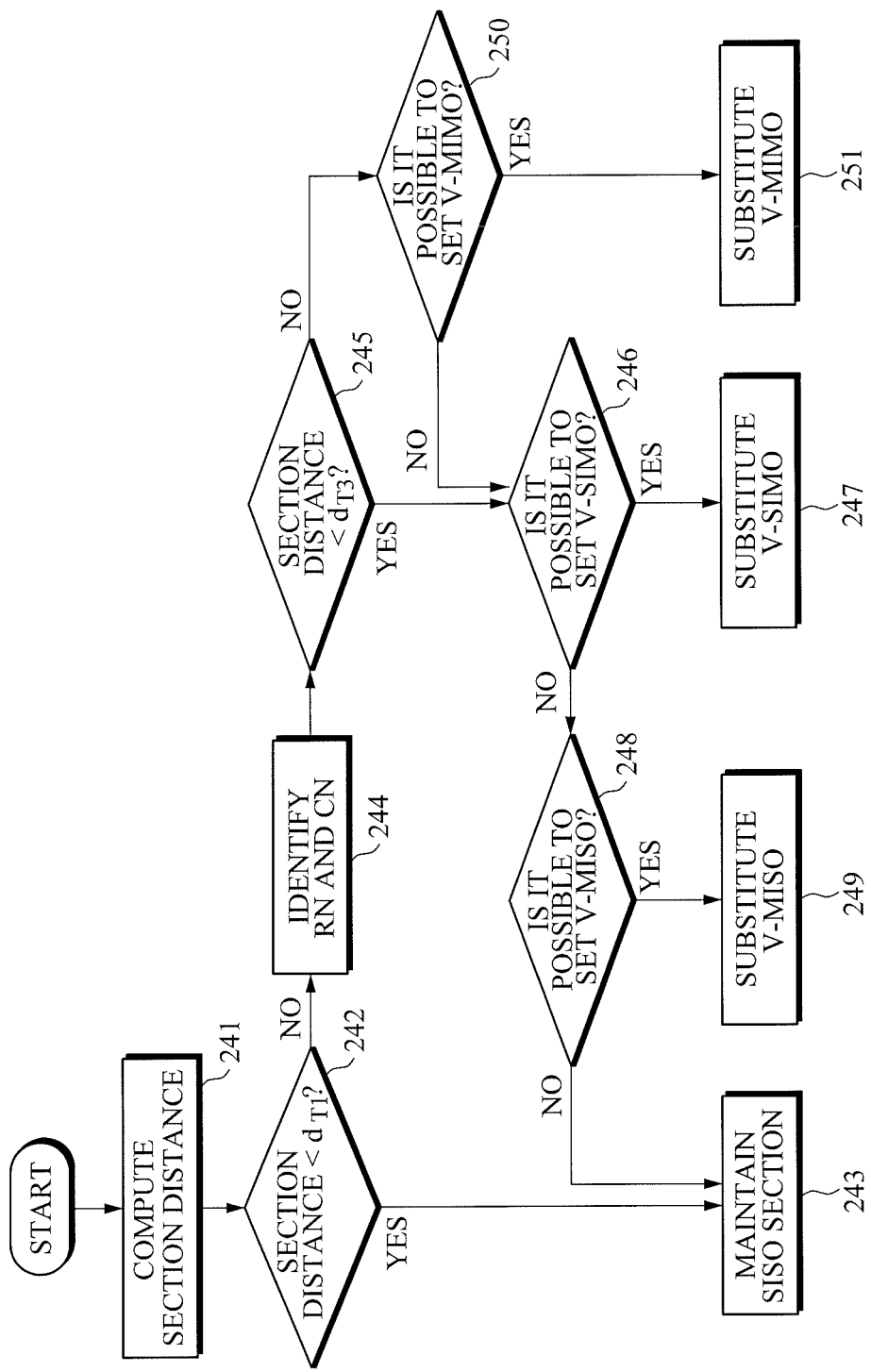

An example of details of the operation 232 is illustrated in FIG. 5.

Referring to FIG. 5, if a section distance calculated at 241 is shorter than $d_{T1}$, a SISO transmission has the maximum energy efficiency, and thus the current transmission scheme SISO is maintained at 243. As the result of determination at 242, an RN and a CN are identified at 244 if the section distance is not shorter than $d_{T1}$, and it is determined whether the section distance is shorter than $d_{T3}$ at 245. If it is determined that the section distance is shorter than $d_{T3}$ at 245, that is, the section distance is longer than $d_{T2}$, but shorter than $d_{T3}$, it is determined at 246 whether V-SIMO is available based on collected local node information.

If it is determined at 246 that V-SIMO is available, V-SIMO transmission is substituted for SISO connection at 247. By contrast, if it is determined at 246 that V-SIMO transmission cannot be supported and if it is determined at 248 that V-MISO transmission is available, the SISO transmission is substituted by V-MISO transmission.

However, if it is determined at 248 that neither V-SIMO transmission nor V-MISO transmission is available, the procedure proceeds to operation 243 to maintain the SISO transmission.

Meanwhile, if it is determined at 248 that the section distance is longer than $d_{T3}$, it is checked at 250 whether the corresponding section can support V-MIMO transmission based on the collected local node information. If it is determined that the V-MIMO transmission can be supported, the SISO transmission is substituted by V-MIMO at 251, and otherwise, the procedure proceeds to operation 246 described above.

Figure 6:
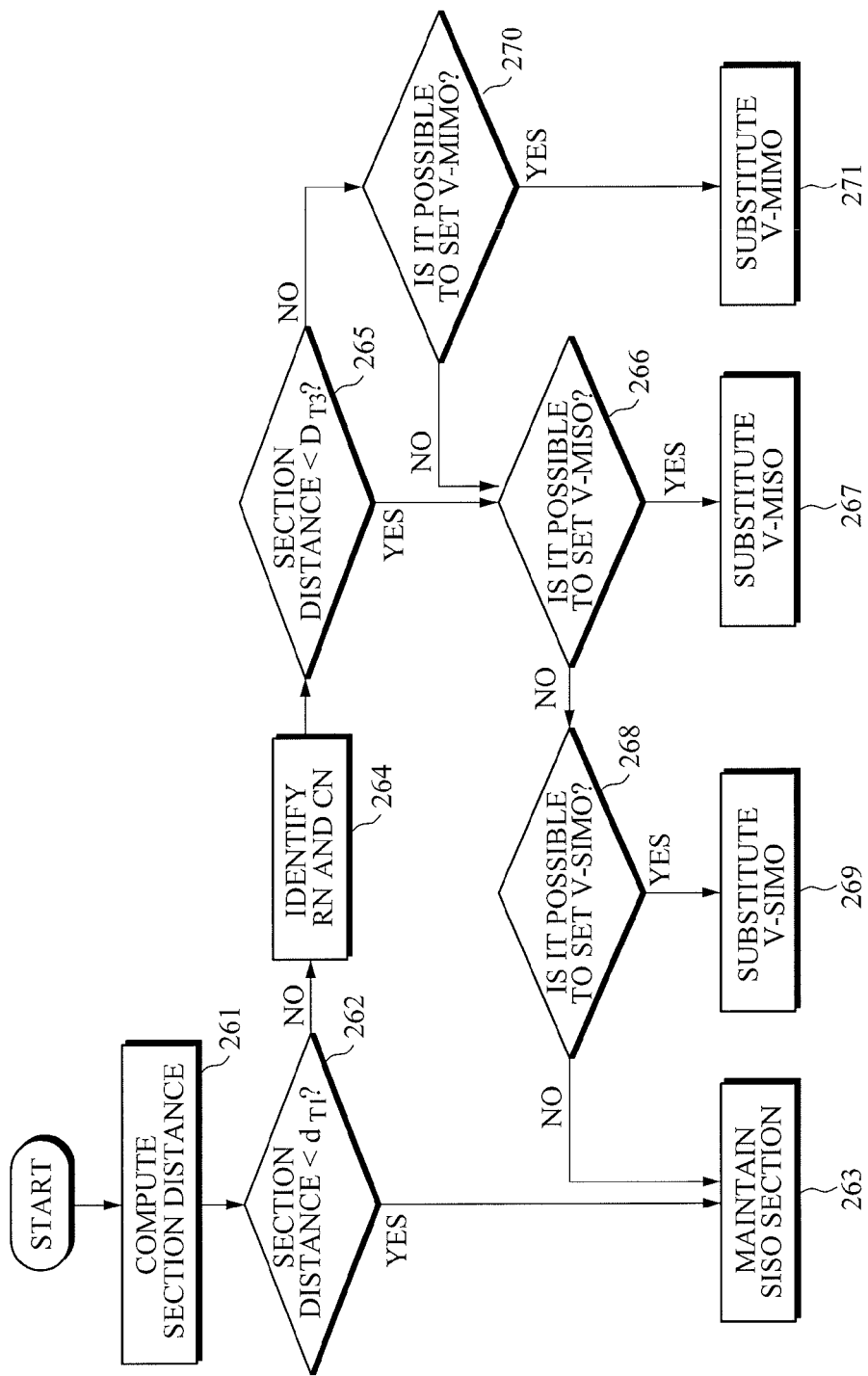

FIG. 6 illustrates a flowchart of an example showing details of operation 233 shown in FIG. 4. Referring to FIG. 6, it is determined at 262 whether or not a section distance calculated at 261 is shorter than $d_{T1}$. If it is determined at 262 that the section distance is shorter that $d_{T1}$, SISO transmission has the maximum energy efficiency, and thus the current transmission scheme SISO is maintained at 263. If it is determined at 262 that the section distance is not shorter than $d_{T1}$ an RN and a CN are identified at 264, and it is determined at 265 whether the section distance is shorter than $d_{T3}$. If it is determined that the section distance is shorter than dT3, that is, the section distance is longer than $d_{T2}$ but shorter than $d_{T3}$, it is determined at 266 whether V-MISO transmission is available based on the collected local node information.

If it is determined that V-MISO transmission is available, the SISO transmission is substituted by V-MISO transmission at 267. When it is determined at 266 that V-MISO transmission is not available and it is determined at 268 that V-SIMO transmission is available, the transmission is substituted by V-SIMO transmission at 269.

However, if it is determined at 268 that neither V-SIMO transmission nor V-SIMO transmission is available, the procedure proceeds to operation 263 to maintain the SISO transmission.

Meanwhile, if it is determined at 265 that the section distance is longer than dT3, it is checked at 270 whether the corresponding section can support V-MIMO transmission based on the collected local node information. If the V-MIMO transmission is available, the SISO transmission is substituted by V-MIMO at 271, and otherwise, the procedure proceeds to operation 266 described above.

Figure 7:
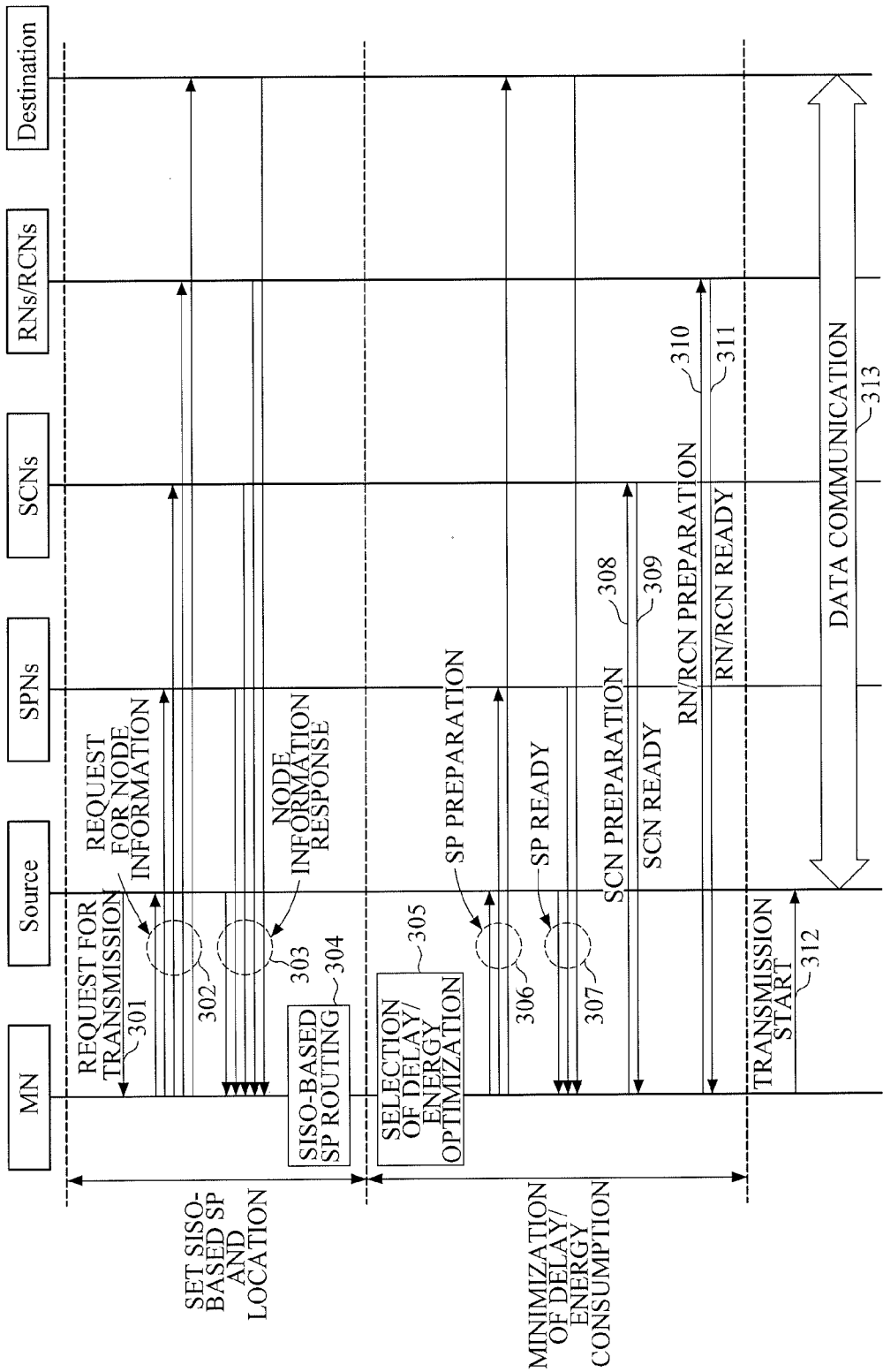
FIG. 7 is a flowchart of messages between nodes in a MIMO method utilizing centralized hybrid routing.

FIG. 7 illustrates a flowchart of messages between nodes in a MIMO method utilizing centralized hybrid routing.

Figure 8:
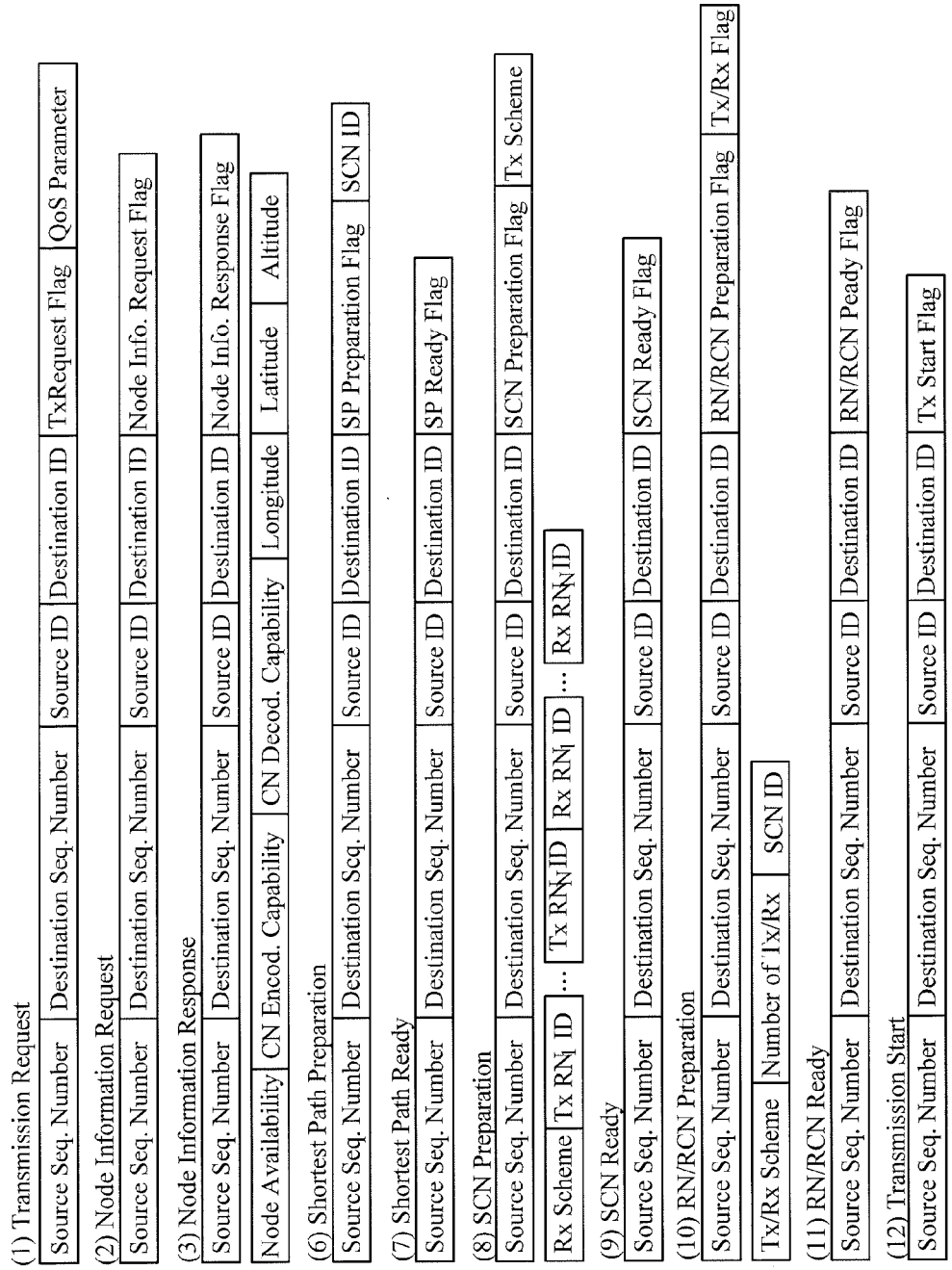
FIG. 8 is a diagram illustrating an example of field formats of messages exchanged at each operation shown in FIG. 7.

FIG. 8 illustrates an example of field formats of messages exchanged at each operation shown in FIG. 7.

At 301, a node (i.e., source node) which is willing to transmit data in an ad-hoc network sends a transmission request (also referred to as a "Tx request") message to an MN.

An example of the transmission request message is illustrated as (1) in FIG. 8.

In FIG. 8, a source sequence number (denoted by Source Seq. Number in FIG. 8) is a field for identifying a message, and it may consist of one byte. The source sequence number is used for every message, and is automatically set each time a message is generated. Generally, a value ranging from a minimum of 00000001 to a maximum of 11111111 is set as the source sequence number in ascending order, and when the value reaches the maximum 11111111, the source sequence number is set from an initial number again. The value of the source sequence number confirms whether a message is redundant, and a source sequence number of a certain message is recorded in a destination sequence number (denoted by Destination Seq. Number in FIG. 8) when an acknowledgement signal of the message is fed back, thereby indentifying the fed-back signal as the acknowledgement signal of the message.

Since the source sequence number is a field that is embedded in all message formats to be transmitted, its description will not be reiterated in descriptions of message format below.

The destination sequence number is a field for message identification, and applied to every message. In addition, in the course of message transmission and reception, a received source sequence number is recorded in the destination sequence number of a message, and thereby the message is identified as an acknowledgement message with respect to a certain message. An initial message to be transmitted to a particular node may have 00000000 as the destination sequence number.

Like the source sequence number, the destination sequence number is a field that is embedded in all message formats to be transmitted, and thus its description will not be iterated in description of message formats below.

Source identifier (ID) is a field for identifying a node that sends a message, in which an ID of a node that is willing to transmit a message is recorded. The source ID may consist of one byte.

Destination ID is a field for identifying a message receiving node, in which an ID of an MN is recorded. The destination ID may consist of one byte.

Transmission request flag (denoted by Tx request flag in FIG. 8) is a field that indicates whether a message is a transmission request message, and it may consist of one byte. In the example illustrated in FIG. 8, it has a value of 1.

A quality of service (QoS) parameter is a field used for a node that is willing to transmit the message to inform the MN of QoS requirements of traffic. The QoS parameter may consist of 5 bits, and QoS requirements are recorded in the QoS parameter while being classified into classes previously defined according to energy consumption threshold and delay time threshold.

The MN that has received the transmission request message (Tx request message) sends a node information request message to all nodes at 302 in order to obtain information necessary for SISO-based shortest routing between the source and the destination which will be performed at 304. Since the node information request message targets all nodes, the identical node information request message is broadcasted without designating a particular node.

An example of a format of the node information request message is illustrated as (2) in FIG. 8.

In the node information request message format, source ID is a field used for identifying a node that sends a message, and it may consist of one byte. Additionally, in the source ID, an ID of the MN is recorded.

Destination ID is a field used for identifying a node that receives the message, and it may consist of one byte. Because the node information request message targets all nodes, a default value, "00000000", may be recorded as the destination ID.

In the above format, a node information request flag is a field that indicates whether the message is a node request message, and it may consist of one bit. In this format, the node information request message may be set as "1."

All nodes that have received the node information request message send their information to the MN at 303. The information to be sent includes location information, node availability, and spatial multiplexing encoding and decoding capabilities of the node. Because all nodes transmit the node information request message to the MN and the messages include information of the respective corresponding nodes, the messages are different from one another.

An example of a format of a node information response message with respect to the node information request message is illustrated as (3) in FIG. 8.

In the node information response message format, a source ID is a field for identifying a node that sends a message, and it may consist of 1 byte. In the source ID, an ID of the node that sends the message is recorded.

Destination ID is a field used for identifying a node that receives the message, and it may consist of one byte, and have an ID of the MN recorded.

Node information response flag is a field that indicates whether the message is a node information response message, and it may consist of one bit. In this example, the node information response flag is set as "1."

Node availability is a field that indicates a determination result of whether the node is available based on the amount of remaining energy and the amount of traffic currently supported, and it may consist of three bits. A node that has more remaining energy and less currently supported traffic has a higher priority. The node availability with the highest priority has the minimum value "000," and the node with the lowest priority "111" is not selected.

CN encoding capability is a field that indicates the capability of a node to encode and transmit a signal, and it may consist of three bits. In the CN encoding capability, the number of signals simultaneously encoded is recorded. If a corresponding node is not capable of encoding, the node has the minimum value "000."

CN decoding capability is a field that indicates the capability of a node to decode signals simultaneously, and it may consist of three bits. In the CN decoding capability, the number of signals simultaneously decoded is recorded. If a corresponding node is not capable of decoding, the node has the minimum value "000."

Message field includes location information fields, which include a longitude field consisting of four bytes, a latitude field consisting of four bytes and an altitude field consisting of two bytes.

At 304, the MN performs the SISO-based shortest routing from the source node to the destination node based on the received information.

The centralized hybrid routing uses a routing scheme such as LAR or GPSR that utilizes geographical information.

Thereafter, the MN performs a select delay/energy optimized scheme at 305.

At 305, if QoS of traffic requires minimization of both the energy consumption and delay time in accordance with the QoS requirements requested by the source node, the minimization of delay time and energy consumption is performed as illustrated in FIG. 5.

Alternatively, if the QoS requirements do not specify conditions for delay time limitation, the minimization of energy consumption is performed as illustrated in FIG. 6.

Then, the MN determines transmission schemes for each section constituting the path from the source node to the destination node via SPNs by performing a delay time and energy consumption minimization algorithm, and informs all nodes participating in transmission of the determination result to prepare for the transmission.

At 306, the MN sends SP preparation messages respectively to the source node, destination node, and SPNs to prepare for the transmission. The contents of the messages are different from one another according to the nodes.

An example of a format of the SP preparation message to be sent is illustrated as (6) in FIG. 8.

Source ID may consist of one byte, and have an ID of the MN recorded therein.

Destination ID may consist of one byte, and have IDs of the source node, the destination node, and the respective SPNs recorded therein.

SP preparation flag is a field that indicates whether or not the message is an SP preparation message, and it may consist of one bit. In this example, the SP preparation flag has a value of "1."

SCN ID may consist of one byte. If an SCN is required according to a V-SIMO, V-MISO, or V-MIMO scheme within a section for which an SPN performs data transmission or data reception, the most suitable SCN is selected to be operated within the section, from among neighboring SCNs, and the SPN is informed of an ID of the selected SCN. If the SPN is an SCN or an SCN is not required for transmission within a section, the SCN ID is set to a default value, "00000000."

At 307, the source node, the destination node, and the respective SPNs, which have received the SP preparation messages and complete preparation for transmission, send SP ready messages to the MN to inform of completion of preparation. The contents of the messages are identical with one another.

An example of a format of the SP ready message is illustrated as (7) in FIG. 8.

Source ID may consist of one byte, and have IDs of the respective source node, destination node, and SPNs recorded therein.

Destination ID may consist of one byte, and have an ID of the MN recorded therein.

SP ready flag is a field that indicates whether the corresponding message is an SP ready message, and it may consist of one bit. In this example, the SP ready flag has a value of "1."

Thereafter, at 308, the MN transmits to the respective SCNs SCN preparation messages including information about transmission schemes for each section and RNs or RCNs that participate in transmission. The contents of the messages are different from one another according to the receiving nodes.

An example of a format of the SCN preparation message to be sent is illustrated as (8) in FIG. 8.

Source ID may consist of one byte, and have an ID of the MN recorded therein.

Destination ID may consist of one byte, and have IDs of the respective SCNs recorded therein.

SCN preparation flag is a field that indicates whether the message is an SCN preparation message, and it may consist of one bit. In this example, the SCN preparation flag has a value of "1."

Transmission scheme (Tx scheme in FIG. 8) is a field for identifying a transmission scheme to be used by a corresponding SCN for data transmission in the next section, and it may consist of two bits. For example, "00" as a value of the transmissions scheme field may indicate SISO transmission, "01" may indicate V-SIMO transmission, "10" may indicate V-MISO transmission, and "11" may indicate V-MIMO transmission.

Reception scheme (Rx scheme in FIG. 8) is a field for identifying a transmission scheme to be used for data transmission in a current section by an SCN in a previous section, and it may consist of two bits. For example, "00" as a value of the reception scheme field may indicate SISO transmission, "01" may indicate V-SIMO transmission, "10" may indicate V-MISO transmission, and "11" may indicate V-MIMO transmission.

Each of IDs (Tx $RN_1$ ID to Tx $RN_n$ ID in FIG. 8) of transmission relay nodes may consist of one byte, and indicate IDs of RNs to be utilized by an SCN which transmits data to the next section according to transmission schemes other than SISO transmission scheme. In the case of SISO transmission, the IDs of transmission relay nodes may be set to a default value "00000000."

Each of IDs (Rx $RN_1$ ID to Rx $RN_n$ ID) of receiving RNs may consist of one byte, and indicate IDs of RNs to be utilized by an SCN which receives data according to a transmission scheme other than SISO transmission scheme. In the case of SISO transmission scheme, the IDs of receiving relay nodes may be set to a default value "00000000."

At 309, the SCNs that have received the SCN preparation messages normally and completed the transmission preparation transmit SCN ready messages to the MN. The contents of the SCN ready messages are identical with one another.

An example of a format of the SCN ready message is illustrated as (9) in FIG. 8.

Source ID may consist of one byte, and have IDs of the respective SCNs recorded therein. Destination ID may consist of one byte, and have an ID of the MN recorded therein.

SCN ready flag may consist of one bit, and is a field that indicates whether or not the message is an SCN ready message. In this example, the SCN ready flag has a value of "1."

At 310, the MN sends RN/RCN preparation messages to the RNs and the RCNs to inform of which of the respective RNs and RCNs participate in transmission or reception and IDs of corresponding SCNs in sections. The contents of the messages are different from one another according to the nodes.

An example of a format of the RN/RCN preparation message is illustrated as (10) in FIG. 8.

Source ID may consist of one byte, and have an ID of the MN recorded therein. Destination ID may consist of one byte, and have IDs of the respective RNs and RCNs recorded therein.

RN/RCN preparation flag may consist of one bit, and is a field that indicates whether the message is an RN/RCN preparation message. In this example, the RN/RCN preparation flag has a value of "1."

Transmission/reception (Tx/Rx) flag may consist of one bit, and is a field that indicates whether a corresponding node participates in transmission or reception. If the node participates in transmission, the Tx/Rx flag has a value of "1," and if the node participates in reception, the Tx/Rx flag has a value of "0."

Transmission/reception (Tx/Rx) scheme may consist of two bits, and it indicates a corresponding transmission/reception scheme utilized by a node which participates in transmission or reception.

Number of transmission/reception (Tx/Rx) may consist of three bits, and it indicates the number of signals to be encoded simultaneously by an RCN in the case of the V-MISO or V-MIMO scheme.

SCN ID may consist of one byte, and it indicates an ID of an SCN in a section in which a corresponding node participates in transmission or reception.

At 311, each of the RNs and the RCNs which have completed transmission preparation in response to receiving the RN/RCN preparation messages normally transmits an RN/RCN ready message to the MN to inform of completion of the preparation. The contents of the sent RN/RCN ready messages are identical with one another.

An example of a format of the RN/RCN ready message is illustrated as (11) in FIG. 8.

Source ID may consist of one byte, and have IDs of the respective RNs and RCNs recorded therein. Destination ID may consist of one byte, and have an ID of the MN recorded therein.

RN/RCN ready flag may consist of one bit, and is a field that indicates whether or not the message is an RN/RCN ready message. In this example, the RN/RCN ready flag field has a value of "1."

At 312, the MN sends a transmission start message to the source node to start transmission in response to receiving the messages informing of completion of the preparation from all nodes that participate in transmission.

An example of a format of the transmission start message is illustrated as (12) in FIG. 8.

Source ID has an ID of the MN recorded therein. Destination ID has an ID of the source node recorded therein. Tx start flag may consist of one bit, and is a field that indicates whether or not the message is a Tx start message. In this example, the Tx start flag field has a value of "1."

Figure 9:
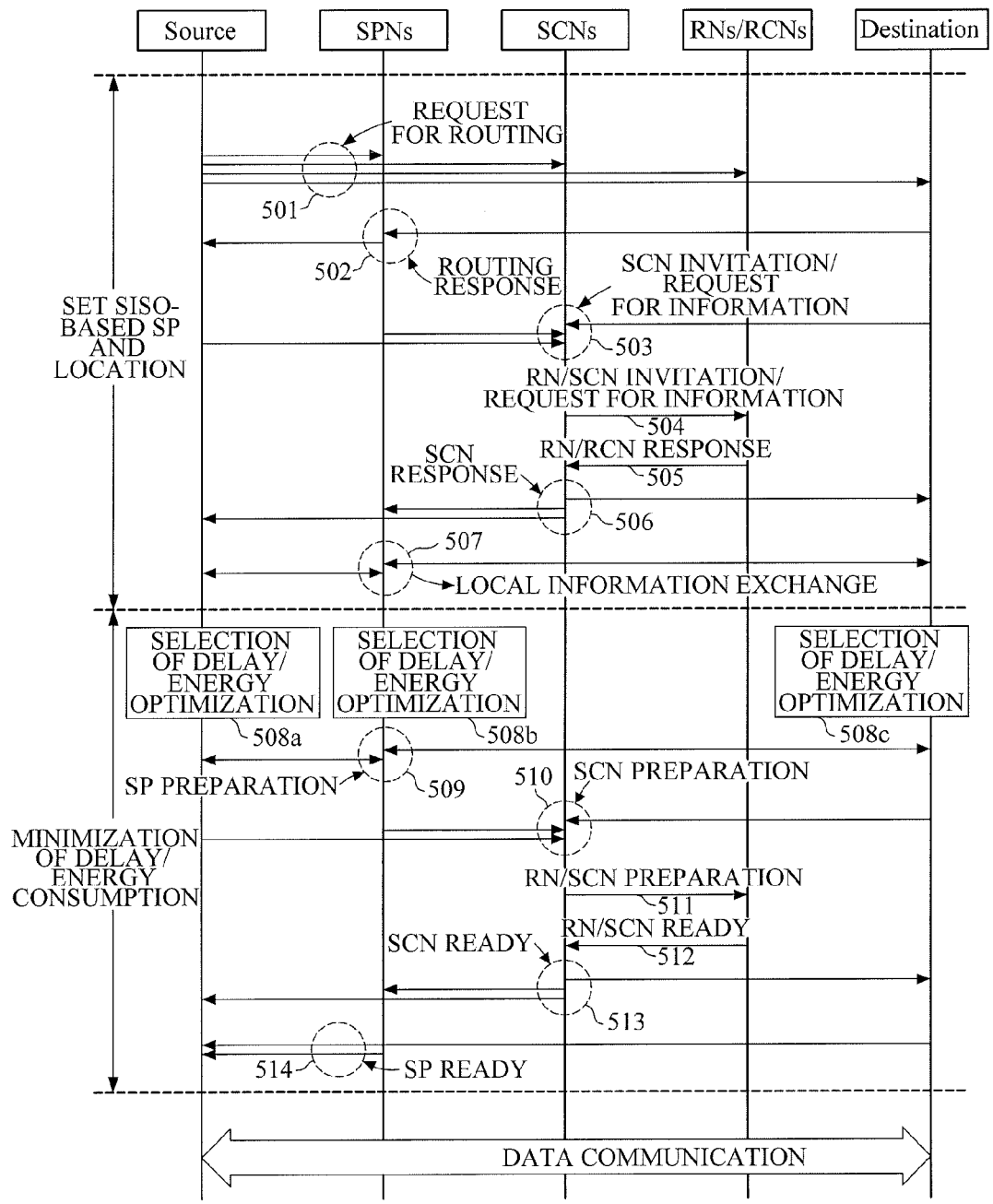
FIG. 9 is a flowchart of messages between nodes when distributed hybrid routing is performed.

FIG. 9 illustrates a flowchart of messages between nodes when distributed hybrid routing is performed.

Figure 10:
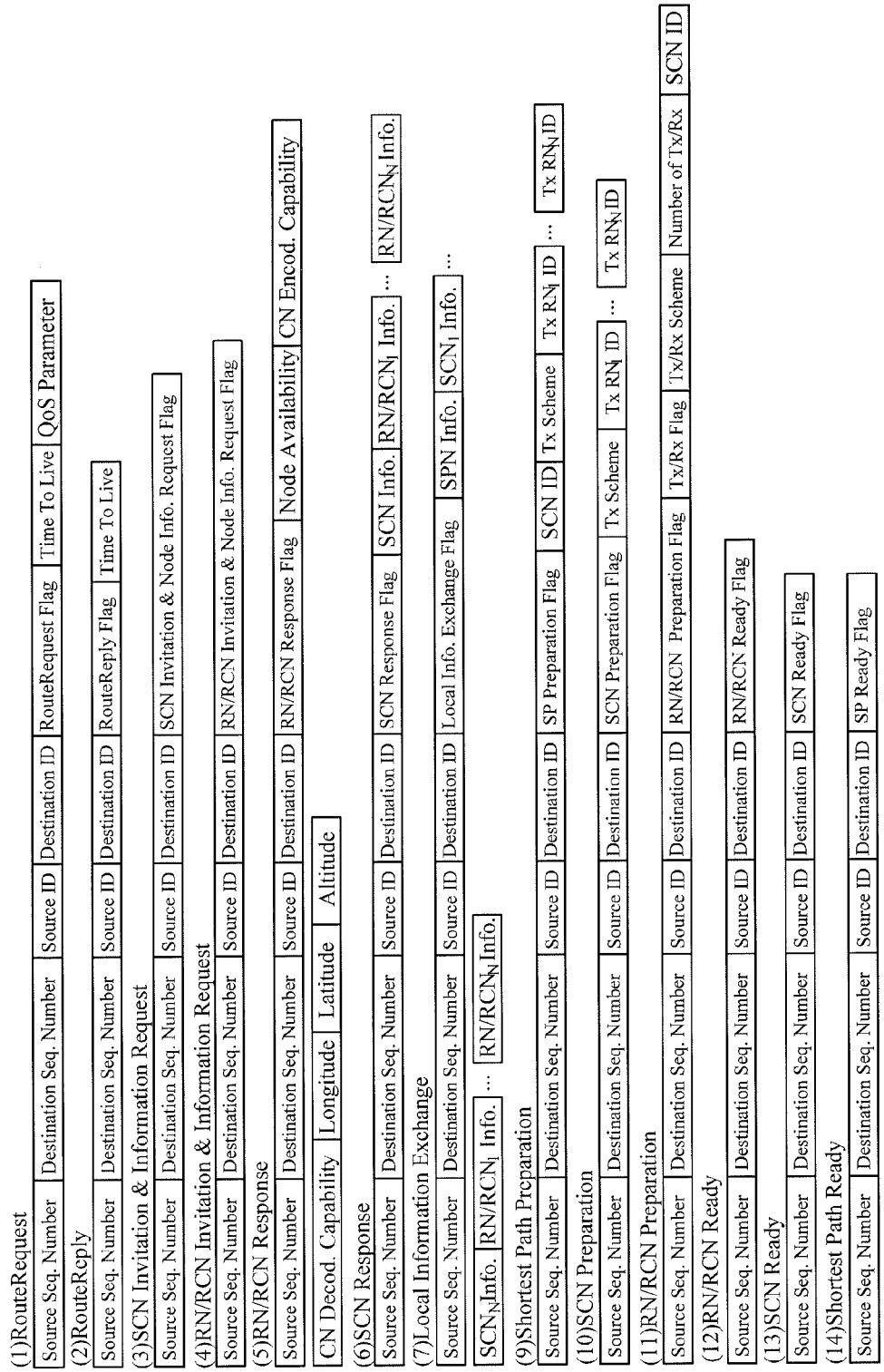
FIG. 10 is a diagram illustrating an example of formats of messages exchanged between the nodes according to the flowchart shown in FIG. 9.

FIG. 10 illustrates an example of formats of messages exchanged between the nodes according to the flowchart shown in FIG. 9.

Unlike the centralized hybrid routing, the distributed hybrid routing does not have an MN to control other nodes, and thus control for transmission should be conducted by individual communication between the nodes.

Protocol introduced herein is designed in a manner that control is organically performed over the nodes around an SPN on the SISO-based SP. To this end, primarily the SP from the source node to the destination node is necessarily found.

A flat routing scheme such AODV and DSR as described above is utilized to set the SP.

If a node that is willing to transmit data is present in an ad-hoc network, the node searches for a path to a destination by sending a route request message to the other nodes in a broadcast manner at 501. The node includes QoS requirements of traffic in the route request message to be sent. An example of a format of the route request message is illustrated as (1) in FIG. 10.

Referring to (1) in FIG. 10, source sequence (seq.) number and destination sequence (seq.) number are the same as those described above, and thus will not be reiterated.

Source ID may consist of one byte, and have an ID of the node that is willing to transmit data recorded therein. Destination ID may consist of one byte and it has a default value of "00000000" since all nodes are the target of the message.

Route request flag may consist of one bit, and is a field that indicates whether the message is a route request message. In this example, the route request flag has a value of "1."

Time to live (TTL) may consist of one byte, and is a field for indicating a value to be set in preparation for an event where the broadcasted messages will fail to find an appropriate path and loop will occur. A message having a TTL over a predetermined value is automatically discarded.

QoS parameter may consist of five bits, and is a field for informing the nodes to receive the message of the QoS requirements of traffic. QoS requirements are recorded in the QoS parameter while being classified into classes previously defined according to energy consumption threshold and delay time threshold.

In response to the route request message reaching a destination node, a path of the message to the destination node is set as the SP, and the destination node sends a route reply message to a source node along the set SP at 502. Nodes which receive the route reply message are aware of themselves being determined as SPNs.

An example of a format of the route replay message is illustrated as (2) in FIG. 10.

Referring to (2) in FIG. 10, source ID may consist of 1 byte, and have an ID of the destination node recorded therein. Destination ID may consist of one byte, and have an ID of the source node recorded therein.

Route reply flag may consist of one bit, and is a field that indicates whether the message a route reply message. In this example, the route reply flag field has a value of "1."

At 503, the respective nodes set as SPNs by the source node, the destination node, and the flat routing send an SCN invitation and information request message to all nodes in a certain section to invite SCNs within the section to entrust the SCNs with data transmission for use of a V-SIMO, V-MISO, or V-MIMO scheme. In addition, if SCNs form a section, the nodes set as SPNs request RNs and RCNs which are included in the section and the SCNs to transmit their information. If the nodes set as SPNs are SCNs, the above procedure is omitted.

An example of a format of the SCN invitation and information request message is illustrated as (3) in FIG. 10.

Referring to (3) in FIG. 10, source ID may consist of one byte, and have IDs of the respective source node, destination node and SPNs recorded therein. Destination ID may consist of one byte, and it has a default value of "00000000" since the message targets to all nodes within the section.

SCN invitation and information request flag may consist of one bit, and is a field that indicates whether the message is an SCN invitation and information request message. In this example, the SCN invitation and information request flag field has a value of "1."

In response to receiving the SCN invitation and information request message, at 504, the respective SCNs (or SPNs when the SPNs are SCNs) send an RN/RCN invitation and information request message to all nodes within a certain section to invite RNs and RCNs within the section to use them as relay nodes for use of a V-SIMO, V-MISO, or V-MIMO scheme.

An example of a format of the RN/RCN invitation and information request message is illustrated as (4) in FIG. 10.

Referring to (4) in FIG. 10, source ID has IDs of the respective SCNs. Destination ID has a default value "00000000" since the message targets all nodes within the section.

RN/RCN invitation and information request flag may consist of one bit, and is a field that indicates whether the message is an RN/RCN invitation and information request message. In this example, the RN/RCN invitation and information request flag field has a value of "1."

In response to receiving RN/RCN invitation and information request message, at 505, each of the RNs or RCNs sends an RN/RCN response message to an SCN having the strongest signal intensity as a destination. The RN/RCN response message includes location information, and information of node availability and spatial multiplexing encoding and decoding capabilities.

An example of a format of the RN/RCN response message is illustrated as (5) in FIG. 10.

Referring to (5) in FIG. 10, source ID may consist of one byte, and have IDs of RNs or RCNs recorded therein. Destination ID may consist of one byte, and have an ID of an SCN having the strongest signal intensity.

RN/RCN response flag may consist of one bit, and is a field that indicates whether the message is an RN/RCN response message. In this example, the RN/RCN response flag has a value of "1."

Node availability may consist of three bits. Each node determines its own availability based on the amount of remaining energy and the amount of traffic currently supported, and transmits the determination result to the MN. A node that has more remaining energy and less currently supported traffic has a higher priority. The node availability with the highest priority has the minimum value "000," and the node with the lowest priority "111" is excluded from selection.

CN encoding capability may consist of three bits, and is a field that indicates a capability of the node encoding and transmitting a signal and has the number of signals which can be simultaneously encoded recorded therein. If the node is not capable of encoding, the node has the minimum value of "000."

CN decoding capability may consist of three bits, and is a field that indicates a capability of the node simultaneously decoding signals and has the number of signals which can be simultaneously decoded recorded therein. If the node is unable to decode, the node has the minimum value of "000."

At 506, the SCN which has received the RN/RCN response messages from the RNs or RCNs for a previously set period of time includes RNs or RCNs which have signal intensity greater than a predetermined level in the section of the SCN, and transmits information of the included RNs or RCNs along with its own information to the SPN. In this case, a destination is set to an SPN having the strongest signal intensity from among the SPNs which have sent the SCN invitation and information request messages. The SCN which has not received the RN/RCN response message during a set period of time does not transmit the RN/RCN response message, and consequently the SCN is excluded from the candidate available SCNs. If a node selected as an SPN is an SCN, these procedures are omitted.

An example of a format of the SCN response message is illustrated as (6) in FIG. 10.

Source ID may consist of one byte, and have an ID of an SCN. Destination ID may consist of one byte, and have an ID of the SPN having the strongest signal intensity from among the received SPNs.

SCN response flag may consist of one bit, and is a field that indicates whether the message is an SCN response message. In this example, the SCN response flag has a value of "1."

SCN information may consist of 89 bits, and indicate location information, node availability, and spatial multiplexing encoding and decoding capabilities of the SCN.

Each of $RN/RCN_1$ to $RN/RCN_N$ information may consist of 89 bits, and indicate information about location, node availability, and spatial multiplexing encoding and decoding capabilities of an RN or an RCN present in a section of the corresponding SCN.

The SPN which has received the SCN response message during a set period of time includes the SCNs which have a signal intensity greater than a set level and exchanges the SCN relevant information and information of the SPN itself with other SPNs at 507. The range of sharing the information varies according to settings, and generally the range is up to two hops. To this end, the SPN transmits a local information exchange message to other SPNs within the range of sharing the information, the local information exchange message from each SPN includes individual information of the SPN, and thus all local information exchange messages are different from one another. To avoid message collision, each node utilizes a CSMA scheme for transmission.

An example of a format of the location information exchange message is illustrated as (7) in FIG. 10.

Source ID may consist of one byte, and have an ID of each SPN recorded therein. Destination ID may consist of one byte, and have an ID of an SPN which is present within an information sharing range, from among the SISO-based SP nodes.

Local information exchange flag may consist of one bit, and is a field that indicates whether the message is a local information exchange message. In this example, the local information exchange flag has a value of "1."

SPN information may consist of 89 bits, and indicate location information, node availability, and spatial multiplexing encoding and decoding capabilities of the SPN.

Each of $SCN_1$ to $SCN_N$ information may consist of 89 bits, and indicate location information, node availability, and spatial multiplexing encoding and decoding capabilities of SCNs present within a range of the corresponding SPN.

Each of $RN/RCN_1$ to $RN/RCN_N$ information may consist of 89 bits, and indicate information about location, node availability, and spatial multiplexing encoding and decoding capabilities of an RN or an RCN present in a section of the corresponding SCN.

At 508, the respective SPNs select a delay/energy optimization scheme according to QoS requirements requested by the source node. If the QoS of traffic requires energy consumption minimization along with the delay time minimization, a delay time and energy consumption minimization algorithm as shown in FIG. 9 is performed. If there is no delay time limitation, an energy consumption minimization algorithm as shown in FIG. 10 is performed.

At 509, the SPNs which have selected transmission methods optimal to the respective sections using the delay time and energy consumption minimization algorithm inform all nodes participating in data transmission of the selection result, thereby allowing them to be ready for the transmission. To this end, each SPN, first, transmits an SP preparation message to the next SPN on the SP to inform of the transmission scheme in use, so that the next SPN can prepare for data reception.

An example of a format of the SP preparation message is illustrated as (9) in FIG. 10.

Source ID may consist of one byte, and have an ID of the SPN recorded therein. Destination ID may consist of one byte, and have an ID of the next SPN on the SISO-based SP.

SP preparation flag may consist of one bit, and is a field that indicates whether the message is an SP preparation message. In this example, the SP preparation flag has a value of "1."

SCN ID may consist of one byte, and indicate an ID of an SCN participating in transmission of a corresponding node. In transmission according to a SISO scheme, a default value "00000000" is recorded.

Transmission (Tx) scheme may consist of 2 bits, and is a field that identifies a transmission scheme to be used for the next section by the SCN present within the domain of the SPN. For example, the field value '00' may indicate SISO transmission, '01' may indicate V-SIMO transmission, '10' may indicate V-MISO transmission, and '11' may indicate V-MIMO transmission.

Each of Tx $RN_1$ to Tx $RN_N$ IDs may consist of one byte, and indicate an ID of an RN to be utilized when the SCN present within the domain of the SPN uses another transmission scheme other than the SISO transmission.

Each of Tx $RN_1$ to Tx $RN_N$ IDs may be set as a default value, 00000000, when SISO transmission is utilized.

At 510, the SPN transmits an SCN preparation message to the SCNs within the domain of the SPN to transfer information about the transmission scheme and RNs or RCNs that participate in the transmission. If the node selected as the SPN is an SCN, the above procedure is omitted.

An example of a format of the SCN preparation message is illustrated as (1) in FIG. 10.

Source ID may consist of one byte, and have an ID of the SPN recorded therein. Destination ID may consist of one byte, and have an ID of the corresponding SCN.

SCN preparation flag may consist of one bit, and is a field that indicates whether the message is an SCN preparation message. In this example, the SCN preparation flag has a value of "1."

Transmission (Tx) scheme may consist of two bits, and is a field that identifies a transmission scheme to be used by the SCN for the transmission to the next section. For example, the field value '00' may indicate SISO transmission, '01' may indicate V-SIMO transmission, '10' may indicate V-MISO transmission, and '11' may indicate V-MIMO transmission.

Each of Tx $RN_1$ to Tx $RN_N$ IDs may consist of one byte, and indicate an ID of an RN to be utilized when the SCN uses a transmission scheme other than the SISO transmission. Each of Tx $RN_1$ to Tx $RN_N$ IDs may be set as a default value, 00000000, when SISO transmission is utilized.

In response to receiving the SCN preparation messages, at 511, each of the SCNs notifies the RNs and RCNs present within the domain of the SCN of whether the SCN participates in transmission or reception. An RN/RCN preparation message for the notification is sent from the MN to the RNs and RCNs, and the contents of the messages are different from one another according to the nodes.

An example of a format of the RN/RCN preparation message is illustrated as (11) in FIG. 10.

Source ID may consist of one byte, and have an ID of the MN recorded therein. Destination ID may consist of one byte, and have an ID of a corresponding RN or RCN recorded therein.

RN/RCN preparation flag may consist of one bit, and is a field that indicates whether the message is an RN/RCN preparation message. In this example, the RN/RCN preparation flag has a value of "1."

Transmission and reception (Tx/Rx) flag may consist of one bit, and is a field that indicates whether the corresponding node participates in transmission or reception. If the node participates in transmission, the Tx/Rx flag has a value of "1," and if the node participates in reception, the flag has a value of "0."

Tx/Rx scheme may consist of two bits, and indicate a transmission scheme to be utilized when the corresponding node participates in transmission or reception.

Number of Tx/Rx may consist of three bits, and indicates the number of signals which can be simultaneously decoded by an RCN in V-MISO or V-MIMO transmission. SCN ID may consist of one byte, and indicate an ID of the SCN present within the section in which the corresponding node participates in transmission or reception.

At 512, the RNs and RCNs that have prepared for transmission in response to receiving the RN/RCN preparation message normally notify the SCN that the RNs and RCNs are ready.

An example of a format of an RN/RCN ready message for the notification is illustrated as (12) in FIG. 10.

Source ID may consist of one byte, and have an ID of a corresponding RN or RCN recorded therein. Destination ID may consist of one byte, and have an ID of a corresponding SCN recorded therein. RN/RCN ready flag may consist of one bit, and is a field that indicates whether the message is an RN/RCN ready message. In this example, the RN/RCN ready flag has a value of "1."

At 513, the SCNs that have prepared for transmission in response to receiving the SCN preparation message normally notify the SPN of completion of preparation. If the SCN is the same as the SPN, the above procedure will be omitted.

An example of a format of SCN ready message to be sent for the notification is illustrated as (13) in FIG. 10.

Source ID has an ID of a corresponding SCN recorded therein. Destination ID may have an ID of the SPN recorded therein.

SCN ready flag may consist of one bit, and is a field that indicates whether the message is an SCN ready message. In this example, the SCN ready flag has a value of "1."

At 514, each of SPNs that have received the SCN ready messages from the SCNs notifies the source node through the SISO-based SP that the SPN has prepared for transmission. In response to receiving SP ready messages from all SPNs, the source node begins transmission.

An example of a format of the SP ready message is illustrated as (14) in FIG. 10.

Source ID may consist of one byte, and is a field for identifying a node that transmits the message. In this example, the source ID has an ID of each SPN recorded therein. Destination ID may consist of one byte, and is a field for identifying a node to receive the message at a destination. In this example, the destination ID has an ID of the source node recorded therein.

SPN ready flag may consist of one bit, and is a field that indicates whether the message is an SPN ready message or not. In this example, the SPN ready flag has a value of "1."

Figure 11:
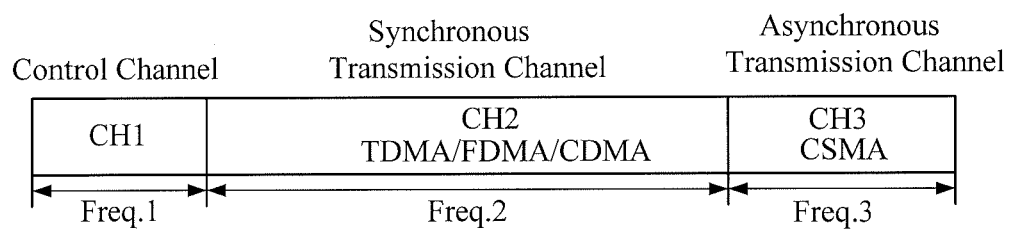
FIG. 11 is a diagram illustrating how to allocate channels for communication between nodes in an ad-hoc network.
Figure 12:
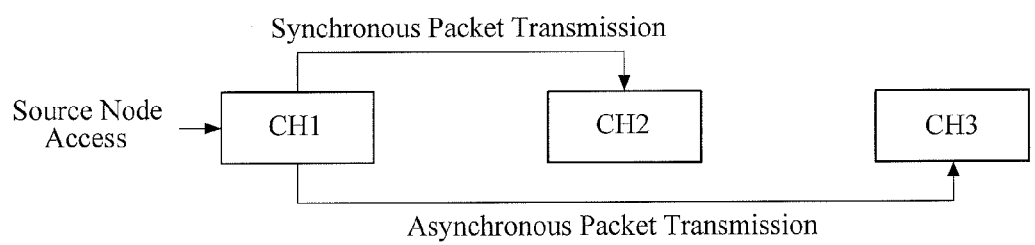
FIG. 12 is a flowchart illustrating an example showing how a node willing to transmit data accesses a channel.

FIGS. 11 and 12 illustrate examples showing how to allocate channels for communication between nodes in an ad-hoc network.

In FIG. 11, the entire available frequency band is divided into three channels. A first channel is a control channel which is used for transmission and receiving all control messages required for transmission preparation. The first channel is used for communication between an MN and other nodes in the case of centralized hybrid routing, and for communication between nodes on the SISO-based SP and other nodes out of the SP in the case of distributed hybrid routing.

A second channel is a synchronous transmission channel which is used for synchronous transmission. When a number of nodes request transmission simultaneously, packet scheduling based on a TDMA/FDMA/CDMA scheme is performed.

A final channel is an asynchronous transmission channel which is used for asynchronous transmission. When a number of nodes request transmission, packet scheduling based on CSMA is performed.

In asynchronous transmission, to minimize the energy consumption, a distance of a transmission section is maximized, resulting in lengthening a transmission standby time in relation with the multiple accesses. If the same transmission channel is used for the asynchronous transmission and the synchronous transmission which takes into consideration both the energy consumption minimization and the transmission delay time limitation, a transmission standby time for the synchronous transmission is likely to be increased together with the transmission standby time for the asynchronous transmission, and thus the above transmissions are performed over different channels, thereby overcoming the above drawbacks.

FIG. 12 illustrates a flowchart of an example showing how a node willing to transmit data accesses a channel. The node that is willing to transmit data accesses the control channel and proceeds with a preparation process for transmission. The preparation for transmission is completed through procedures as shown in FIG. 7 in the case of centralized hybrid routing or procedures as shown in FIG. 9 in the case of distributed hybrid routing. When the preparation for transmission is completed, as shown in FIG. 12, the node accesses the asynchronous transmission channel and begins transmission according to a CSMA scheme in the case of asynchronous transmission, or accesses the synchronous transmission channel and begins transmission according to one of TDMA/FDMA/CDMA schemes in operation by the system.

Figure 13:
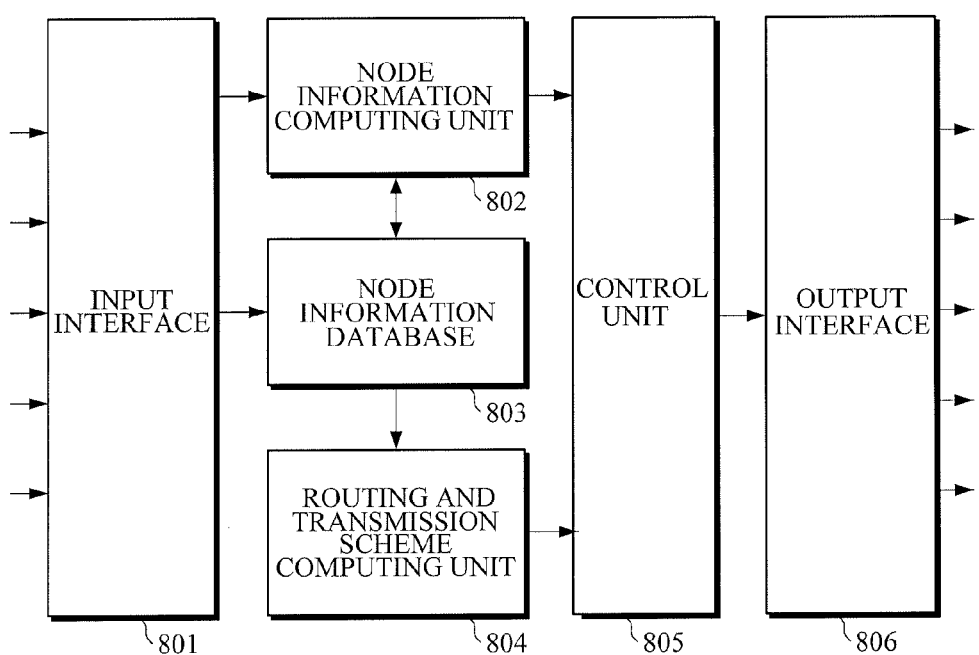
FIG. 13 is a diagram illustrating an example of a management node (MN).

FIG. 13 illustrates an example of an MN. Referring to FIG. 13, an input interface 801 receives information, and a node information computing unit 802 uses the received information to compute node information related to an ID, a location, availability and spatial multiplexing encoding and decoding capabilities of each node, and stores the computed node information in a node information database 803. A routing and transmission scheme computing unit 804 computes an appropriate path from a source node to a destination node and a transmission scheme based on node information stored in the node information database 803, and transmits the computed path and transmission scheme to a control unit 805 of the MN.

Then, the control unit 805 transmits signals for controlling the entire transmission in a network to external nodes through an output interface 806.

Figure 14:
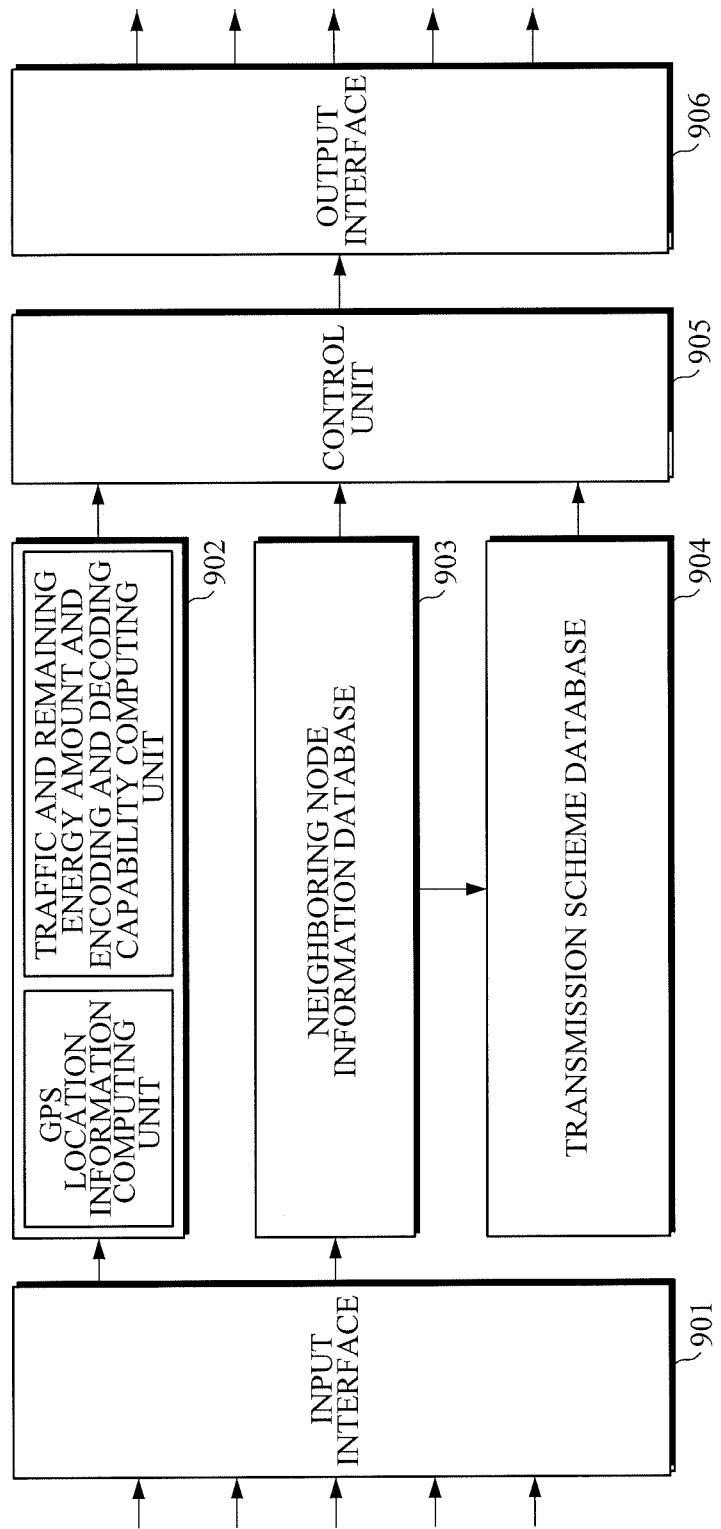
FIG. 14 is a diagram illustrating an example of a relay node (RN) which operates in a centralized hybrid routing environment.

FIG. 14 illustrates an example of an RN which operates in a centralized hybrid routing environment.

An input interface 901 receives a node information request message from the MN and outputs it. Then, a GPS location information computing unit/traffic and remaining energy amount and encoding and decoding capability computing unit 902 computes information of the RN itself in response to the node information request message from the MN. The information to be computed includes location information, node availability, and spatial multiplexing encoding and decoding capabilities.

In addition, the input interface 901 transmits pieces of node information and transmission schemes of other nodes which are transferred from the MN, respectively, to a neighboring node information database 903 and a transmission scheme database 904.

Thereafter, a control unit 905 outputs data through an output interface 906 based on the computed information and information output from the databases 903 and 904.

Figure 15:
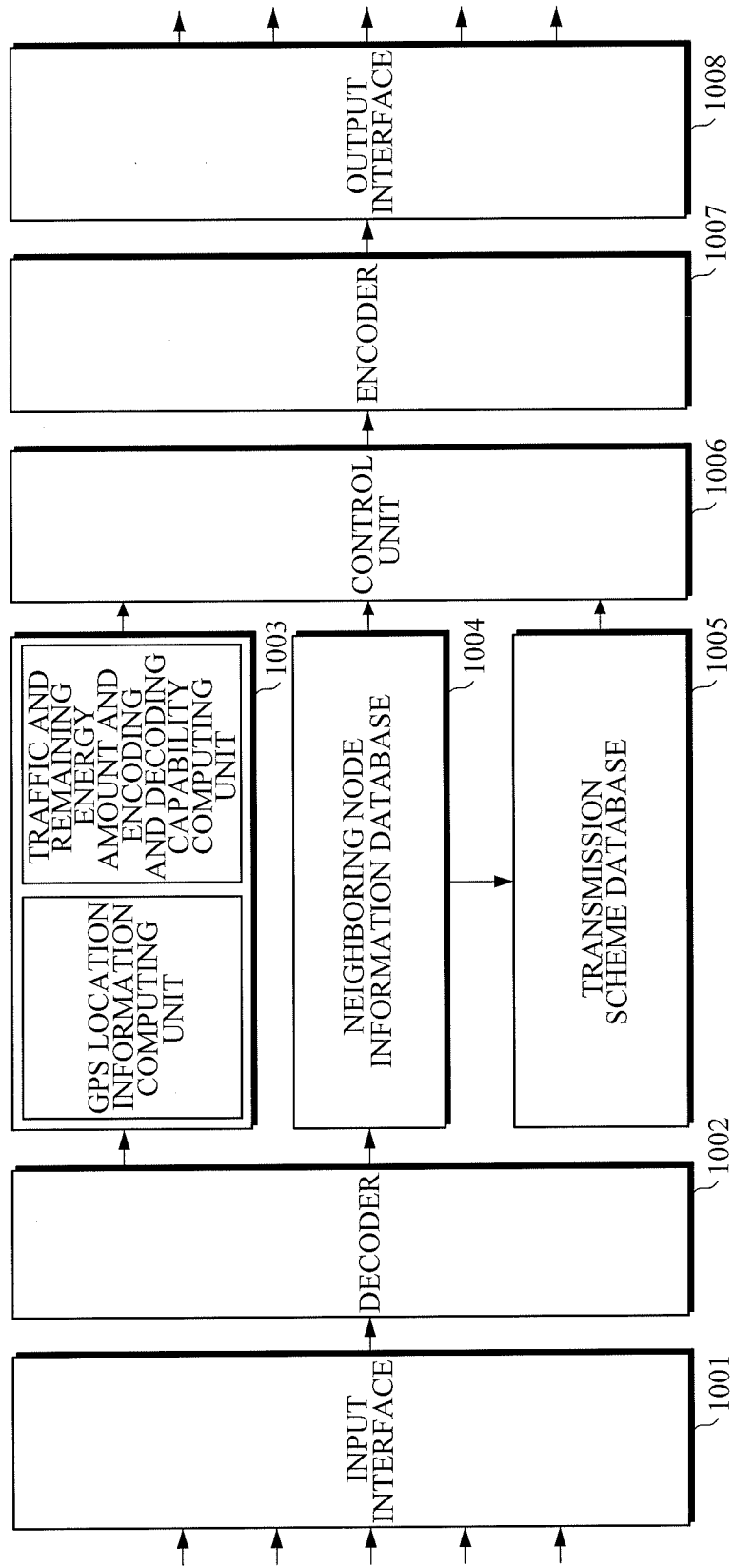
FIG. 15 is a diagram illustrating an example of a combining node (CN) which operates in a centralized hybrid routing environment.

FIG. 15 illustrates an example of a CN which operates in a centralized hybrid routing environment.

Although the CN is identical with an RN in its configuration, the CN further includes a decoder 1002 and an encoder 1007, and is thereby capable of transmitting signals or receiving signals simultaneously.

Figure 16:
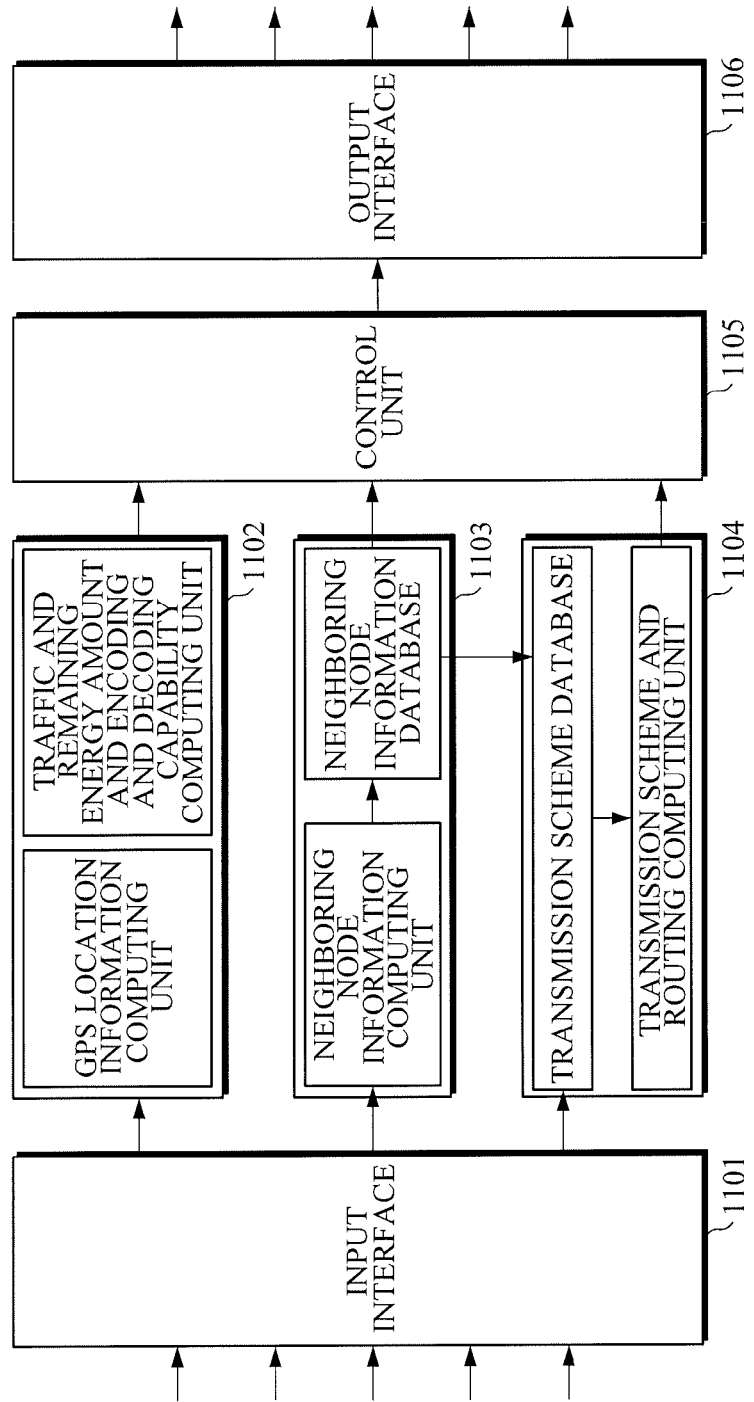
FIG. 16 is a diagram illustrating an example of an RN which operates in a distributed hybrid routing environment.

FIG. 16 illustrates an example of an RN which operates in a distributed hybrid routing environment.

When the RN is set as a source node, a destination node, or an SPN, a neighboring node information computing unit 1103 receives pieces of node information of CNs and RNs within a domain through an input interface 1101 and stores the received information in a neighboring node database 1103. Then, a transmission scheme and routing computing unit 1104 computes a transmission scheme and path of each node based on the node information and information of a transmission scheme database 1104. Here, the transmission scheme is determined with reference to the databases according to a section distance and QoS requirements, as described above.

Figure 17:
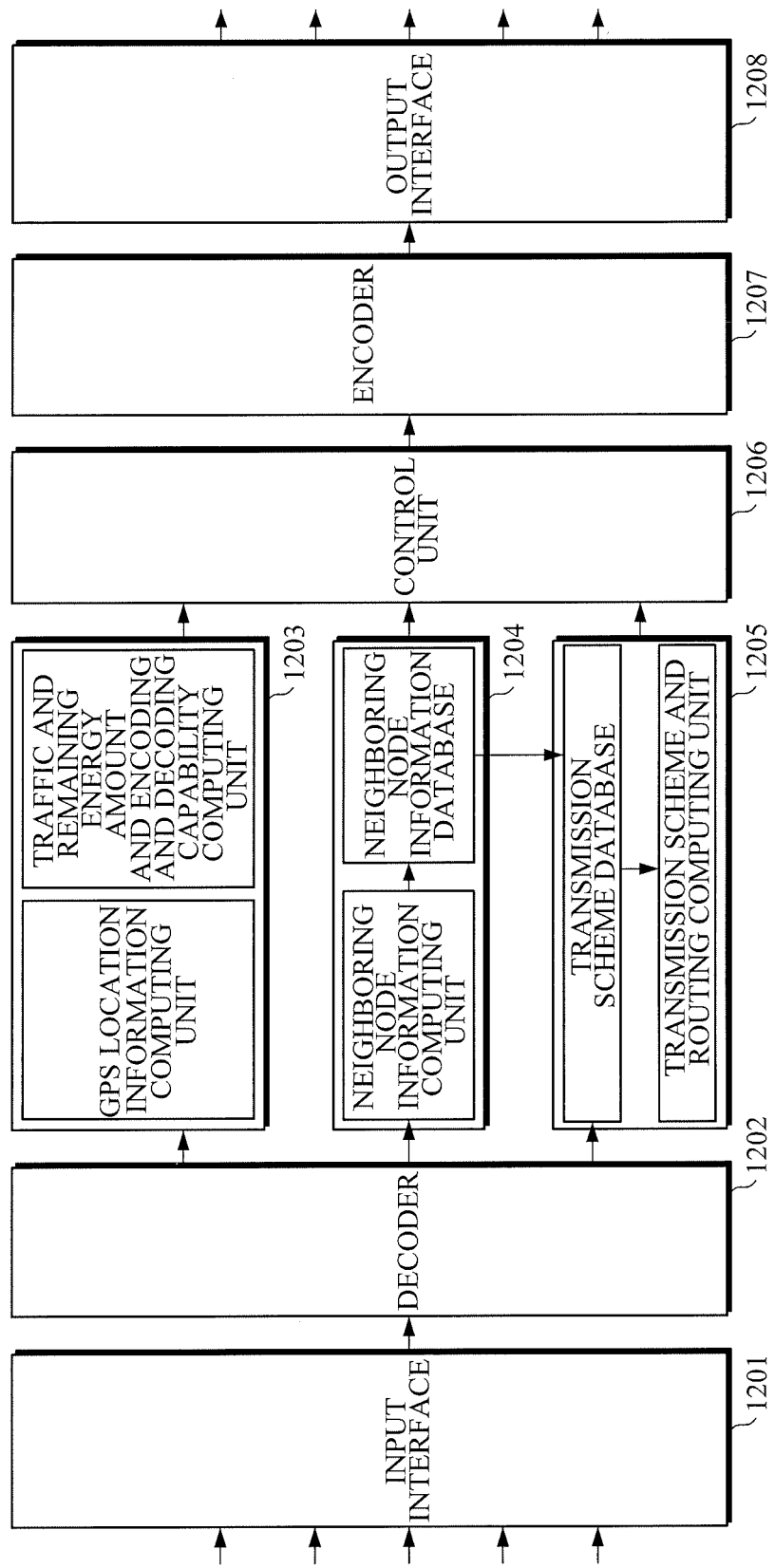
FIG. 17 is a diagram illustrating an example of a CN which operates in a distributed hybrid routing environment.

FIG. 17 illustrates an example of a CN which operates in a distributed hybrid routing environment.

Although the CN is identical with an RN in its configuration, the CN further includes a decoder 1202 and an encoder 1207, and is thereby capable of transmitting signals or receiving signals simultaneously.

An example of transmitting data according to a hybrid V-MIMO transmission method in a network in which a source node is 100 m apart from a destination node, each node has a maximum transmission distance of 40 m, and RNs and CNs are located randomly will be described below. For convenience of explanation, it is assumed that routing for the SISO-based SP is performed by an SCN-oriented algorithm.

FIGS. 18 to 22 illustrate examples of graphs showing changes in a routing path.

Figure 18:
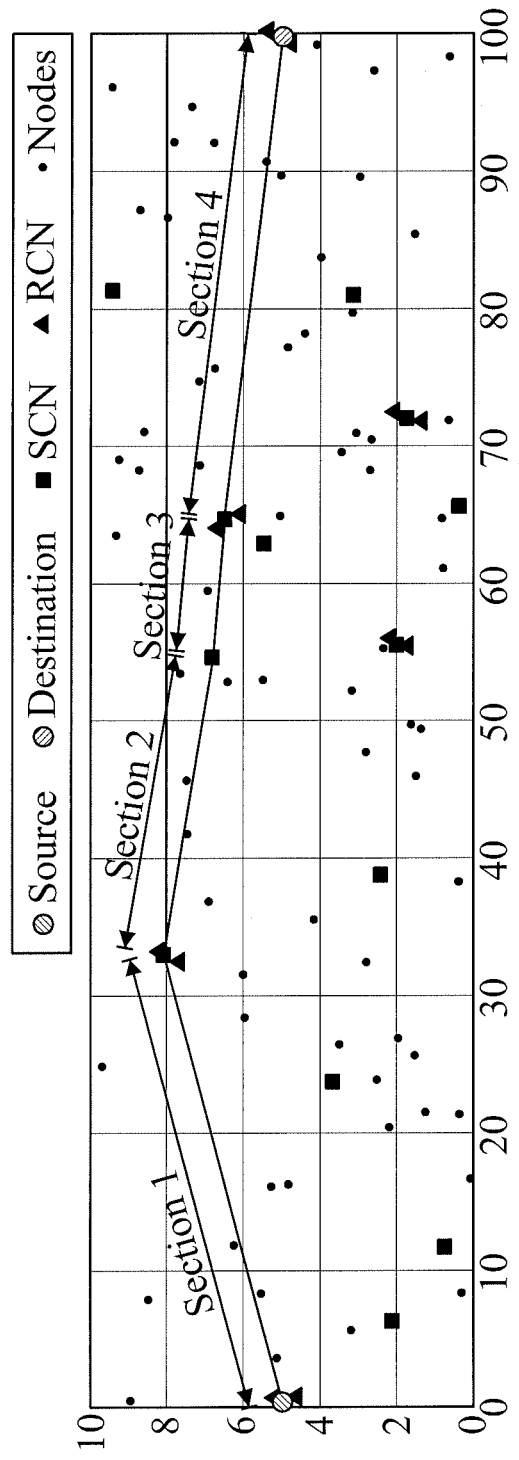
FIGS. 18 to 22 are examples of graphs showing changes in a routing path.

As shown in FIG. 18, the SISO-based SP from a source node to a destination node is set by routing such as LAR, and AODV, as described above.

Prior to selecting a transmission scheme, the MN or SPNs check(s) QoS requirements of traffic based on collected information. Hereinafter, an algorithm according to QoS requirements will be described in detail.

<Example when Energy Consumption Minimization and Time Delay Minimization are Required>

Figure 19:
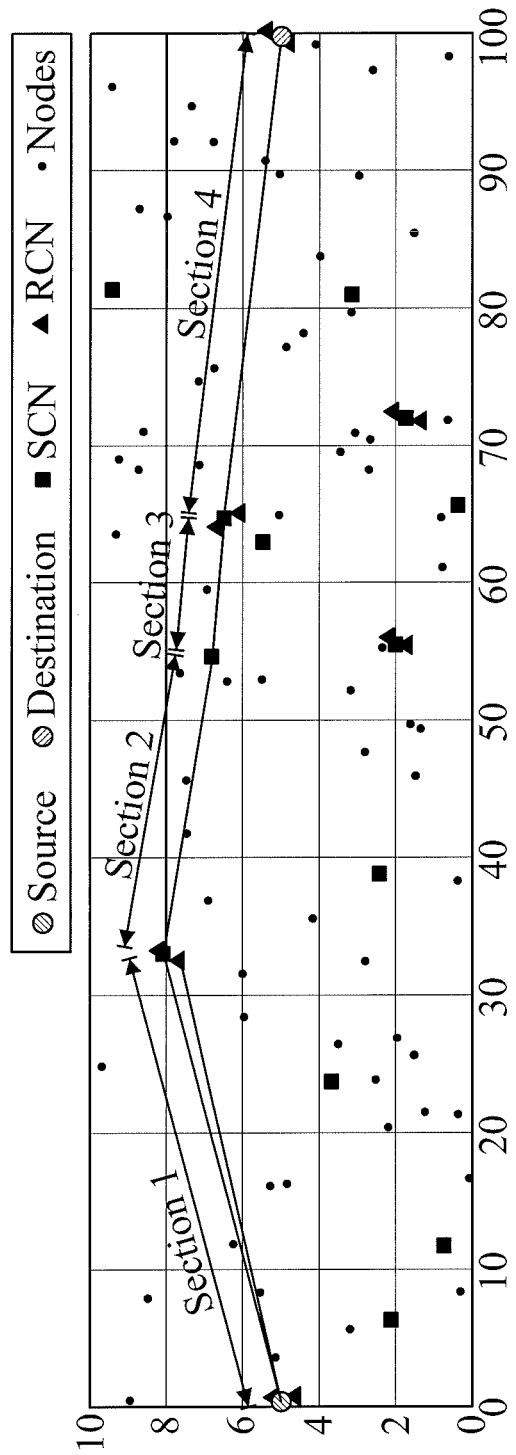
Figure 20:
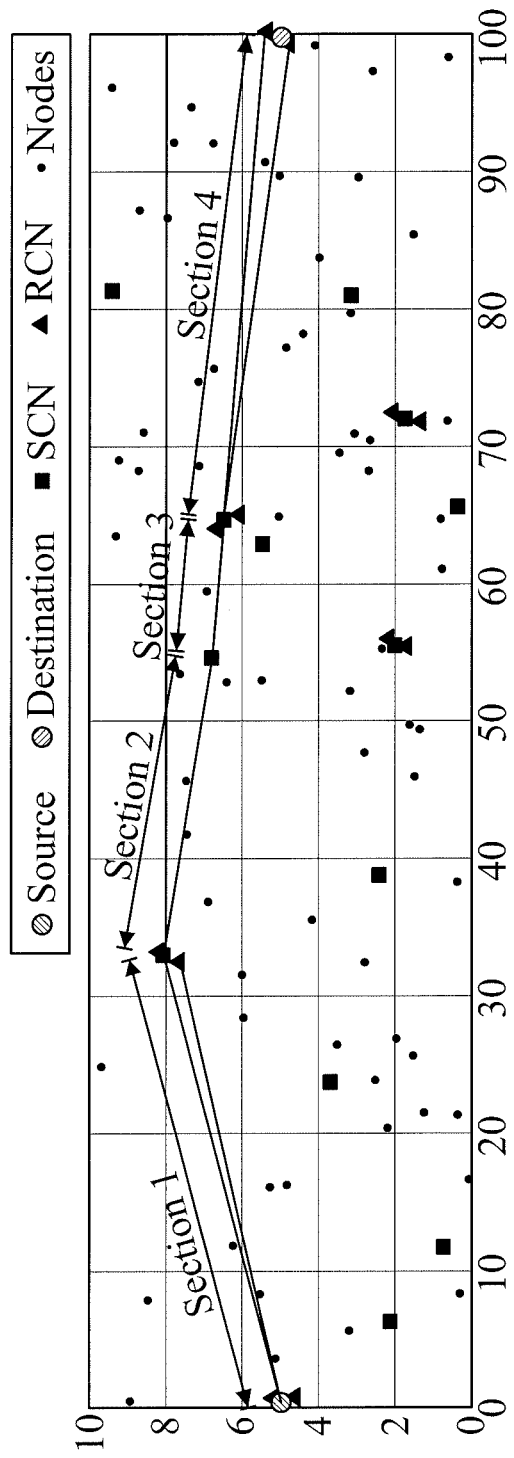
Figure 21:
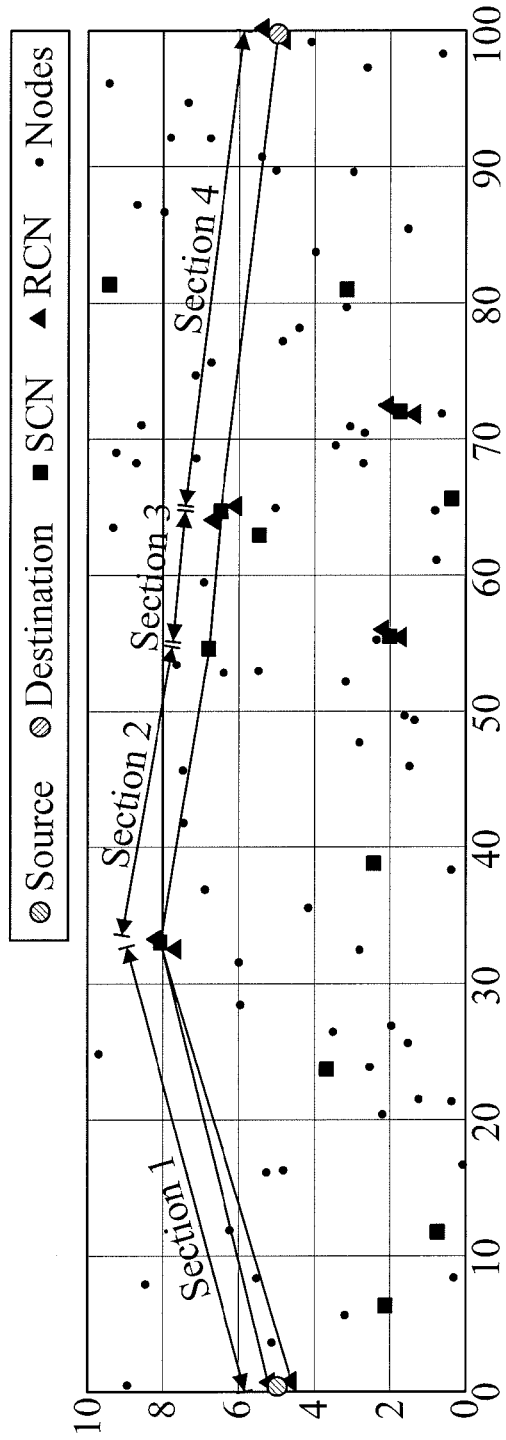

The MN or the SPNs confirm(s) each section distance and compare(s) the section distances with $d_{T1}$, $d_{T2}$, and $d_{T3}$. When the distance between the source node and the destination node is 100 m, $d_{T1}$ is approximately 23 m, $d_{T2}$ is approximately 33 m, and $d_{T3}$ is approximately 100 m. As shown in FIGS. 18 to 20, since section 1 is longer than $d_{T2}$ and shorter than $d_{T3}$, the possibility of V-SIMO transmission is checked according to the above-described algorithm.

Since an RCN is present at a receiving side of section 1, SISO transmission is substituted by V-SIMO transmission, which is illustrated in FIG. 19. Section 2 is shorter than $d_{T1}$, and thus another transmission scheme is not sought and a SISO path is maintained. Section 3 is also shorter than $d_{T1}$, and hence a SISO path is maintained. Since section 4 is longer than $d_{T2}$ and shorter than $d_{T3}$, the possibility of V-SIMO transmission is checked according to the above-described algorithm. If an RCN is present at a receiving side of section 4, SISO transmission is substituted by V-SIMO transmission.

A data transmission path according to the above-described algorithm is as illustrated in FIG. 20.

<Example in the Case of Only Energy Consumption Minimization Required>

Figure 22:
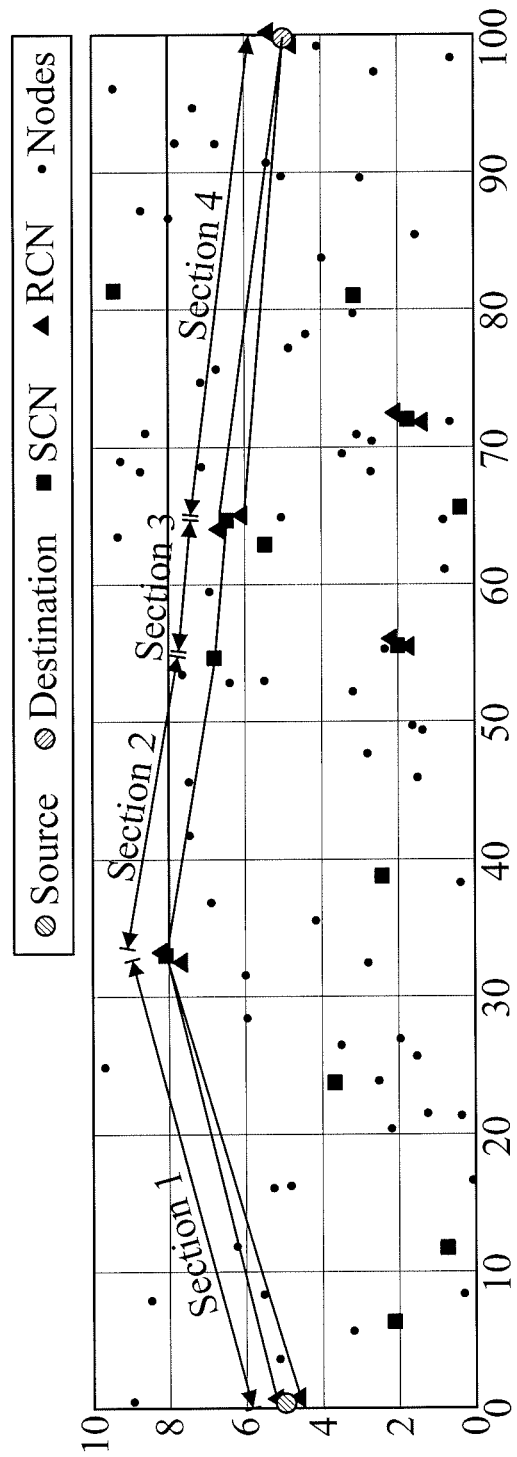

The MN or the SPNs confirm(s) each section distance and compare(s) the section distances with $d_{T1}$, $d_{T2}$, and $d_{T3}$. As described above, section 2 and section 3 are shorter than $d_{T1}$, and thus a SISO path is maintained. Section 1 and section 4 are longer than $d_{T1}$ and shorter than $d_{T2}$, and hence the possibility of V-MISO transmission is checked. As section 1 and section 4 are longer than dT2 and shorter than dT3 and have RNs at their transmission sides, it is determined that V-MISO transmission is available and thus SISO transmission is substituted by V-MISO transmission. The substitutions in section 1 and section 4 are illustrated, respectively, in FIGS. 21 and 22. Moreover, a data transmission path according to the above-described algorithm is as illustrated in FIG. 22.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A hybrid virtual multi-input multi-output (V-MIMO) transmission method of a management node in a wireless ad-hoc network in which a transmission path from a source node to a destination node is divided into one or more sections, the hybrid V-MIMO transmission method comprising:

obtaining one or more pieces of node information of one or more nodes by transmitting an information request message to the nodes in response to a transmission request message for data transmission from the source node to the destination node;

setting a shortest path (SP) from the source node to the destination node based on the obtained node information;

determining transmission schemes, either asynchronous or synchronous, individually for nodes present on the SP wherein for asynchronous transmission, minimize the number of sections between the source node and the destination node in the path and a distance of each section is as extended as much as possible to save energy, and for synchronous transmission, select a path that has the smallest number of intermediate nodes while satisfying a limitation of periodic packet transfer delay time;

determined whether the service quality of traffic requires minimization of energy consumption and delay time, if it is required, the delay time and energy consumption are minimized and if it not, only an energy minimization algorithm is performed;

check information of a CN and RN of a transmitter and a receiver of each section, thereby determining whether V-SIMO (virtual single-input multi-output), V-MISO, or V-MIMO transmission is possible, where in CN is combining node based on energy efficiency ratings;

issuing a transmission preparation request by transmitting the determined transmission schemes to the respective corresponding nodes; and transmitting a transmission start message to the source node in response to transmission ready responses from the respective nodes.

2. The hybrid V-MIMO transmission method of claim 1, wherein the information request message is transmitted in a broadcast manner.

3. The hybrid V-MIMO transmission method of claim 1, wherein the node information includes one or more of location information of a node, node availability information, and information regarding spatial multiplexing encoding and decoding capabilities.

4. The hybrid V-MIMO transmission method of claim 1, wherein the setting of the SP comprises setting the SP in a manner that can minimize the number of sections between the source node and the destination node in the case of asynchronous transmission.

5. The hybrid V-MIMO transmission method of claim 1, wherein the setting of the SP comprises selecting a path that has the smallest number of intermediate nodes while satisfying periodic packet transmission delay time limitation in the case of synchronous transmission.

6. The hybrid V-MIMO transmission method of claim 1, wherein the transmission request message includes quality of service (QoS) requirements of traffic, and the determining of the transmission scheme comprises determining the transmission scheme selectively according to whether QoS requirements request both energy consumption minimization and delay time minimization or only the energy consumption minimization.

7. The hybrid V-MIMO transmission method of claim 1, wherein the determining of the transmission schemes comprises determining one from among a virtual single-input single-output (V-SISO) scheme, a virtual multiple-input single-output (V-MISO) scheme, a V-MIMO scheme, and a virtual single-input multiple-output (V-SIMO) scheme.

8. The hybrid V-MIMO transmission method of claim 7, wherein the determining of the transmission schemes comprises determining another transmission scheme if the determined transmission scheme is not possible to be set, while priorities for selecting the transmission schemes are changed according to distances of the sections.

9. A hybrid virtual multiple-input multiple-output (V-MIMO) transmission method in a wireless ad-hoc network in which a transmission path from a source node to a destination node is divided into one or more sections, the hybrid V-MIMO transmission method comprising:

setting a shortest path (SP) from the source node to the destination node between the source node and the destination node;

obtaining pieces of node information of neighboring nodes present within a set domain of each of the source node, the destination node, and SP nodes and determining transmission schemes for the respective nodes based on the obtained information, either asynchronous or synchronous, individually for nodes present on the SP wherein for asynchronous transmission, minimizing the number of sections between the source node and the destination node in the path and a distance of each section is as extended as much as possible to save energy, and for synchronous transmission, selecting a path that has the smallest number of intermediate nodes while satisfying a limitation of periodic packet transfer delay time;

determining whether the service quality of traffic requires minimization of energy consumption and delay time, if it is required, the delay time and energy consumption are minimized and if it not, only an energy minimization algorithm is performed;

checking information of a CN and RN of a transmitter and a receiver of each section, thereby determining whether V-SIMO (virtual single-input multi-output), V-MISO, or V-MIMO transmission is possible, where in CN is combining node based on energy efficiency ratings;

requesting transmission preparation by transmitting the determined transmission schemes to corresponding nodes from the respective source node, destination node, and SP nodes; and starting transmission at the source node in response to transmission ready responses from the respective nodes.

10. The hybrid V-MIMO transmission method of claim 9, wherein the setting of the SP comprises transmitting an routing request message to one or more nodes from the source node, selecting one of paths through which the routing request message is transmitted and transmitting a routing response message through the selected path from the destination node when the destination node receives the routing request message, and setting a node, by itself, as the SP node when the node receives the routing response message.

11. The hybrid V-MIMO transmission method of claim 10, wherein the routing request message is transmitted in a broadcast manner.

12. The hybrid V-MIMO transmission method of claim 9, wherein the node information includes one or more of location information of a node, node availability information, and information regarding spatial multiplexing encoding and decoding capabilities.

13. The hybrid V-MIMO transmission method of claim 9, wherein the setting of the SP comprises setting the SP in a manner that can minimize the number of sections between the source node and the destination node in the case of asynchronous transmission.

14. The hybrid V-MIMO transmission method of claim 9, wherein the setting of the SP comprises selecting a path that has the smallest number of intermediate nodes while satisfying periodic packet transmission delay time limitation in the case of synchronous transmission.

15. The hybrid V-MIMO transmission method of claim 10, wherein the routing request message includes quality of service (QoS) requirements of traffic, and the determining of the transmission scheme comprises determining the transmission scheme selectively according to whether QoS requirements request both energy consumption minimization and delay time minimization or only the energy consumption minimization.

16. The hybrid V-MIMO transmission method of claim 9, wherein the determining of the transmission schemes comprises determining one from among a virtual single-input single-output (V-SISO) scheme, a virtual multiple-input single-output (V-MISO) scheme, a V-MIMO scheme, and a virtual single-input multiple-output (V-SIMO) scheme.

17. The hybrid V-MIMO transmission method of claim 9, wherein the determining of the transmission schemes comprises determining another transmission scheme if the determined transmission scheme is not possible to be set, while priorities for selecting the transmission schemes are changed according to distances of the sections.

* * * * *